US008897381B2

United States Patent
Li et al.

(10) Patent No.: US 8,897,381 B2
(45) Date of Patent: Nov. 25, 2014

(54) APPARATUS AND METHOD FOR DETERMINING AN EFFECTIVE CHANNEL AND FEEDBACK INFORMATION

(71) Applicant: Fujitsu Limited, Kawasaki-shi, Kanagawa (JP)

(72) Inventors: Baojin Li, Beijing (CN); Xin Wang, Beijing (CN)

(73) Assignee: Fujitsu Limited, Kawasaki (JP)

( * ) Notice: Subject to any disclaimer, the term of this patent is extended or adjusted under 35 U.S.C. 154(b) by 70 days.

(21) Appl. No.: 13/720,335

(22) Filed: Dec. 19, 2012

(65) Prior Publication Data
US 2013/0177103 A1  Jul. 11, 2013

(30) Foreign Application Priority Data

Dec. 31, 2011 (CN) .......................... 2011 1 0460527

(51) Int. Cl.
H04B 7/02 (2006.01)
H04B 7/04 (2006.01)
H04L 25/03 (2006.01)
H04L 25/02 (2006.01)

(52) U.S. Cl.
CPC .............. *H04L 25/03* (2013.01); *H04B 7/0486* (2013.01); *H04B 7/0478* (2013.01); *H04L 25/0208* (2013.01)
USPC ........................................................ 375/267

(58) Field of Classification Search
None
See application file for complete search history.

(56) References Cited

U.S. PATENT DOCUMENTS

| 5,781,239 | A | * | 7/1998 | Mattela et al. | ............ 375/240.15 |
| 8,565,175 | B2 | * | 10/2013 | Fang et al. | ..................... 370/329 |
| 2008/0112500 | A1 | * | 5/2008 | Pan et al. | ....................... 375/267 |
| 2008/0292013 | A1 | * | 11/2008 | Varadarajan et al. | ......... 375/260 |
| 2009/0195453 | A1 | * | 8/2009 | Kim | .............................. 342/373 |
| 2010/0034308 | A1 | * | 2/2010 | Kim et al. | ...................... 375/267 |
| 2010/0091905 | A1 | * | 4/2010 | Khan | ............................. 375/296 |
| 2011/0058621 | A1 | * | 3/2011 | Clerckx et al. | ................. 375/267 |
| 2011/0249637 | A1 | * | 10/2011 | Hammarwall et al. | ....... 370/329 |
| 2012/0058732 | A1 | * | 3/2012 | Wei | .............................. 455/63.1 |
| 2012/0082149 | A1 | * | 4/2012 | Kim et al. | ...................... 370/338 |
| 2013/0272440 | A1 | * | 10/2013 | Khojastepour et al. | ....... 375/267 |

FOREIGN PATENT DOCUMENTS

| CN | 101599788 A | 12/2009 |
| CN | 101931450 A | 12/2010 |
| CN | 102013956 A | 4/2011 |
| WO | WO 2009/095889 A2 | 8/2009 |

* cited by examiner

Primary Examiner — Chieh Fan
Assistant Examiner — Santiago Garcia
(74) Attorney, Agent, or Firm — Arent Fox LLP

(57) ABSTRACT

The present invention provides a method and apparatus for determining an effective channel and feedback information. The method for determining an effective channel comprises: selecting more than one basic column vectors for determining a precoding matrix; calculating products of channel row vectors and the basic column vectors; and determining the effective channel or a Hermitian matrix of the effective channel by using the products. It can be seen from above that with the calculation of products of channel row vectors and more than one basic column vectors determining a precoding matrix and determination of an effective channel or Hermitian matrixes of the effective channel by using the products, the equipment is enabled to lower the amount of calculation and the complexity of calculation, lower the power consumption of the equipment and reduce the circuit size needed in performing corresponding processing in determining an effective channel or Hermitian matrixes of the effective channel and in determining channel feedback information.

7 Claims, 8 Drawing Sheets

APPARATUS AND METHOD FOR DETERMINING AN EFFECTIVE CHANNEL AND FEEDBACK INFORMATION

CROSS-REFERENCED TO RELATED APPLICATION

This application is based upon and claims the benefit of priority of the prior Chinese Patent Application no. 201110460527.9, filed Dec. 31, 2011, the entire contents of which are incorporated herein by reference.

TECHNICAL FIELD

The present invention relates to the field of communications, and in particular to an apparatus and method for determining an effective channel and feedback information.

BACKGROUND ART

A long-term evolution/long-term evolution advanced (LTE/LTE-A) system uses a multiple input multiple output (MIMO) technology and a precoding technology, etc., to increase the capacity of the system.

At the receiving side, the user equipment (UE) determines the information that is needed to be fed back, including a Rank Index (RI) and a Precoding Matrix Index (PMI), also referred to as a Codebook Index, and feeds the information back to a base station. At the transmission side, the base station adjusts the precoding matrix to be used based on the information fed back by the UE.

The procedure of determining the RI and the PMI by the receiving side is as follows:

calculating all the metric values (such as equivalent signal to interference-plus-noise ratio (SINR) or capacity, etc.) to which all the precoding matrixes at pilot subcarriers correspond, and then choosing the RI and PMI to which the maximum value in the metric values corresponds (one precoding matrix corresponds to an RI and a PMI) as the information to be fed back to the transmission side. The procedure of determining feedback information by a receiving side in prior art is described below with reference to a drawing.

FIG. 1 is a schematic diagram of selecting feedback information by a receiving side. The description is given taking that a metric value is a SINR as an example. As shown in FIG. 1, following steps are included:

step 101: calculating effective channel matrixes to which all the RIs and PMIs correspond;

wherein a received signal may be expressed as:

$$Y = HW_n^{(l)} X + N \quad (1)$$

where, Y denotes a vector of the received signal, X denotes a vector of a transmitted signal, and N denotes an additive noise;

an effective channel matrix is:

$$\overline{H}_n^{(l)} = HW_n^{(l)} \quad (2)$$

where, H denotes a channel transmission matrix of $N_R \times N_T$, and $W_n^{(l)}$ denotes a precoding matrix with a rank of l and a codebook index of n;

step 102: calculating metric values to which all the RIs and PMIs in each layer correspond;

wherein the metric values are SINRs, and a minimum mean square error (MMSE) algorithm may be used in calculation; and following formula may be used:

$$SINR_{n,i}^{(l)} = \frac{[Q_n^{(l)}]_{(i,i)}}{1 - [Q_n^{(l)}]_{(i,i)}} \quad (3)$$

where, $Q_n^{(l)} = [(\overline{H}_n^{(l)})^H \overline{H}_n^{(l)} + \sigma_n^2 \cdot I_l]^{-1} (\overline{H}_n^{(l)})^H \overline{H}_n^{(l)}$, $[\cdot]_{(i,i)}$ denotes the ith element in ith row of the matrix, i denotes serial numbers (i=1, 2, . . . l) of layers; and $\sigma_n^2$ denotes noise power, and $I_l$ denotes an l-dimension unit matrix;

step 103: choosing the RI and PMI to which the maximum value in the metric values calculated in step 102 corresponds, as the information fed back to the transmission side.

Furthermore, the metric values may also be capacities, and the capacities to which all the RIs and PMIs in each layer correspond may be expressed as:

$$C_{n,i}^{(l)} = \log\left(\frac{1}{\sigma_n^2 \left[\left((\overline{H}_n^{(l)})^H \overline{H}_n^{(l)} + \sigma_n^2 I_l\right)^{-1}\right]_{(i,i)}}\right) \quad (4)$$

where, $C_{n,i}^{(l)}$ denotes a capacity in the ith layer with a rank of l and a codebook index of n.

In the implementation of the present invention, the inventors found that at least the following defects existed in the prior art:

in step 101, the calculation of an effective channel matrix is an operation of matrix products with a relatively high complexity;

in step 102, in the calculation of metric values, it is necessary to calculate the inversion of positive definite Hermitian matrixes to which each codebook index and RI correspond in prior art, which requires multiple times of matrix inversion calculation with a very high complexity, thereby leading to relatively high consumption of power of the equipment;

for example, for a 4×4 MIMO system, the range of values of RI is 1-4, and the range of values of PMI is 0-15, hence, there are 64 combinations of RI and PMI. In the calculation of a MIMO effective channel, it is necessary to calculate a product of 4×4 matrixes and 4×1 vectors, a product of 4×4 matrixes and 4×2 matrixes, a product of 4×4 matrixes and 4×3 matrixes, a product of 4×4 matrixes and 4×4 matrixes for 16 times, respectively; in addition, it is necessary to perform an inversion operation to a Hermitian matrix composed of MIMO effective channel matrixes (the dimension of the Hermitian matrix is equal to RI), hence, matrix inversion operation is needed to be performed for totally 64 times (the case where RI=1 is considered as performing an inversion operation to matrixes with a dimension of 1), which leads to a high complexity of calculation.

SUMMARY OF THE INVENTION

The object of the present invention is to provide an apparatus and method for determining an effective channel and feedback information, with which the calculation complexity of the equipment is lowered, the power consumption of the equipment is lowered, and the circuit size needed in performing corresponding processing is reduced.

According to an aspect of the embodiments of the present invention, there is provided a method for determining an effective channel, comprising:

selecting more than one basic column vectors for determining a precoding matrix;

calculating products of channel row vectors and the basic column vectors; and determining the effective channel or a Hermitian matrix of the effective channel by using the products.

According to another aspect of the embodiments of the present invention, there is provided an apparatus for determining an effective channel, comprising:

a first selector for selecting more than one basic column vectors for determining a precoding matrix;

a first calculator for calculating products of channel row vectors and the basic column vectors; and a first processor for determining the effective channel or a Hermitian matrix of the effective channel by using the products.

According to still another aspect of the embodiments of the present invention, there is provided a method for determining feedback information, comprising:

determining a Hermitian matrix of an effective channel by using the method stated above;

calculating metric values to which each codebook index and rank correspond based on the Hermitian matrix of the effective channel; and determining that the codebook index and rank to which the maximal metric value corresponds as the feedback information fed back to a transmission side.

According to a further aspect of the embodiments of the present invention, there is provided an apparatus for determining feedback information, comprising:

a second processor comprising every components as stated above, for determining a Hermitian matrix of an effective channel;

a fourth calculator for calculating metric values to which each codebook index and rank correspond based on the Hermitian matrix of the effective channel; and a second selector for selecting the codebook index and rank to which the maximal metric value corresponds as the feedback information fed back to a transmission side.

According to further still another aspect of the embodiments of the present invention, there is provided a method for determining feedback information, comprising:

determining a Hermitian matrix of an effective channel;

calculating metric values to which each codebook index and rank correspond based on the Hermitian matrix of the effective channel; and determining that the codebook index and rank to which the maximal metric value corresponds as the feedback information fed back to a transmission side;

wherein when the rank is 3, the calculating metric values to which each codebook index and rank correspond based on the Hermitian matrix of the effective channel comprises:

performing row transform and column transform on Hermitian matrixes of effective channels of two codebook indices, so that the transformed Hermitian matrixes of the effective channels have identical submatrixes located at the upper left and with a dimension of 2×2;

executing jointly inversion to the transformed Hermitian matrixes of the effective channels of the two codebook indices by using the block inversion lemma of Hermitian matrix, so as to obtain respective inversion matrixes;

determining diagonal elements in the inversion matrixes of the Hermitian matrixes of the effective channels by using the obtained inversion matrixes; and calculating the metric values by using the diagonal elements.

According to an even still another aspect of the embodiments of the present invention, there is provided an apparatus for determining feedback information, comprising:

a sixth processor for determining a Hermitian matrix of an effective channel;

an eighth calculator for calculating metric values to which each codebook index and rank correspond based on the Hermitian matrix of the effective channel; and a third selector for selecting the codebook index and rank to which the maximal metric value corresponds as the feedback information fed back to a transmission side;

wherein when the rank is 3, the eighth calculator comprises:

a seventh processor for performing row transform and column transform on Hermitian matrixes of effective channels of two codebook indices, so that the transformed Hermitian matrixes of the effective channels have identical submatrixes located at the upper left and with a dimension of 2×2;

a ninth calculator for executing jointly inversion to the transformed Hermitian matrixes of the effective channels of the two codebook indices by using the block inversion lemma of Hermitian matrix, so as to obtain respective inversion matrixes;

an eighth processor for determining diagonal elements in the inversion matrixes of the Hermitian matrixes of the effective channels by using the obtained inversion matrixes; and a tenth calculator for calculating the metric values by using the diagonal elements.

According to an even further aspect of the embodiments of the present invention, there is provided a method for determining feedback information, comprising:

determining a Hermitian matrix of an effective channel;

calculating metric values to which each codebook index and rank correspond based on the Hermitian matrix of the effective channel; and determining that the codebook index and rank to which the maximal metric value corresponds as the feedback information fed back to a transmission side;

wherein when the rank is 4 and the number of the codebook indices is 16, the calculating metric values to which each codebook index and rank correspond based on the Hermitian matrix of the effective channel comprises:

dividing the codebook indices into 5 groups, wherein in each group of codebook indices, the diagonal elements in the inversion matrixes of the Hermitian matrixes of the effective channel of each of the codebook indices belong to the same set and are different orders; and calculating the inversion matrix of the Hermitian matrix of the effective channel to which each of the codebook indices in each group corresponds; wherein the calculating the inversion matrix for one group of codebook indices comprises:

calculating the inversion matrix to which one codebook index in the one group of codebook indices corresponds; and obtaining the inversion matrixes to which other codebook indices in the one group of codebook indices correspond, by using the relationship between the inversion matrix to which the one codebook index corresponds and the inversion matrixes of the Hermitian matrixes of the effective channels to which the other codebook indices in the one group of codebook indices correspond, and using the inversion matrix to which the one codebook index corresponds.

According to an even further aspect of the embodiments of the present invention, there is provided an apparatus for determining feedback information, comprising:

a ninth processor for determining a Hermitian matrix of an effective channel;

an eleventh calculator for calculating metric values to which each codebook index and rank correspond based on the Hermitian matrix of the effective channel; and a fourth selector for selecting the codebook index and rank to which the maximal metric value corresponds as the feedback information fed back to a transmission side;

wherein when the rank is 4 and the number of the codebook indices is 16, the eleventh calculator comprises:

a tenth processor for dividing the codebook indices into 5 groups, wherein in each group of codebook indices, the diagonal elements in the inversion matrixes of the Hermitian matrixes of the effective channel of each of the codebook indices belong to the same set and are different orders; and a twelfth calculator for calculating the inversion matrix of the Hermitian matrix of the effective channel to which each of the codebook indices in each group corresponds; wherein the calculating the inversion matrix for one group of codebook indices comprises:

calculating the inversion matrix to which one codebook index in the one group of codebook indices corresponds; and obtaining the inversion matrixes to which other codebook indices in the one group of codebook indices correspond, by using the relationship between the inversion matrix to which the one codebook index corresponds and the inversion matrixes of the Hermitian matrixes of the effective channels to which the other codebook indices in the one group of codebook indices correspond, and using the inversion matrix to which the one codebook index corresponds.

It can be seen from above that the equipment is enabled to lower the calculation complexity, lower the power consumption and reduce the circuit size needed in performing corresponding processing in determining an effective channel or Hermitian matrixes of the effective channel and in determining channel feedback information by calculating products of channel row vectors and more than one basic column vectors for determining a precoding matrix and using the product to determine an effective channel or Hermitian matrixes of the effective channel.

In the following description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising" when used in this specification is taken to specify the presence of stated features, integers, steps or components but does not preclude the presence or addition of one or more other features, integers, steps, components or groups thereof.

DETAILED DESCRIPTION OF THE INVENTION

The foregoing and other features of the embodiments of the present invention will be apparent through the following description with reference to the drawings. These embodiments are merely illustrative and not intended to limit the present invention. For the easy understanding of the principle and the embodiments of the present invention by those skilled in the art, the description of the embodiments of the present invention will be given taking determination of an effective channel of a MIMO system of LTE/LTE-A and determination of channel feedback information as examples; however, it should be understood that the embodiments of the present invention are applicable to all the communication systems in which determination of the above effective channel and feedback information exists.

An embodiment of the present invention provides a method for determining an effective channel, comprising:

selecting more than one basic column vectors for determining a precoding matrix;

calculating products of channel row vectors and the basic column vectors; and determining the effective channel or a Hermitian matrix of the effective channel by using the products.

In this embodiment, the effective channel may be expressed as $HW_n^{(l)}$; where, the rank is l=1~4, and the codebook index is n=0~15; and the Hermitian matrix of the effective channel may be $(HW_n^{(l)})^H HW_n^{(l)}$ or $(HW_n^{(l)})^H HW_n^{(l)}+\sigma_n^2 I_l$; where, H denotes $N_R \times N_T$ channel transmission matrix, $W_n^{(l)}$ denotes a precoding matrix with a rank of l and a codebook index of n, $\sigma_n^2$ denotes a noise power, $I_l$ denotes an l-dimension unit matrix, $N_R$ denotes the number of rows of the channel transmission matrix, i.e. the number of receiving antennas, $N_T$ denotes the number of columns of the channel transmission matrix, i.e. the number of transmission antennas.

With the method above, products of channel row vectors and the basic column vectors may be calculated, and the effective channel or a Hermitian matrix of the effective channel may be determined by using the products, which lowers the calculation complexity, thereby lowering the power consumption of the equipment, and reducing the circuit size needed in performing corresponding processing.

Description is given below taking a 4×4 MIMO system as an example.

Figure 1:
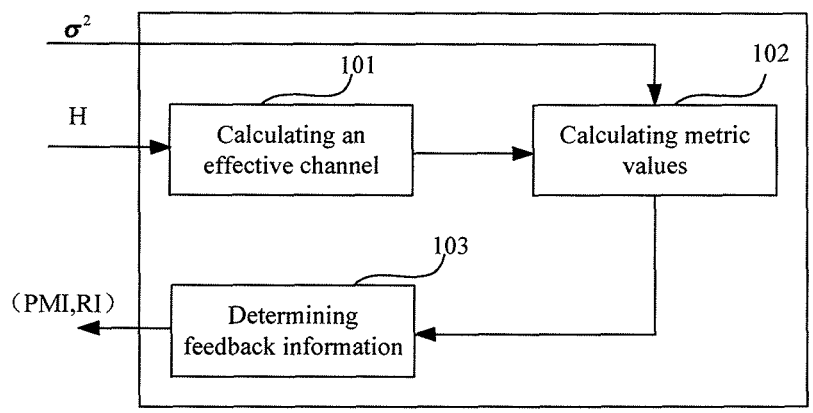
FIG. 1 is a schematic diagram of determining feedback information.
Figure 2:
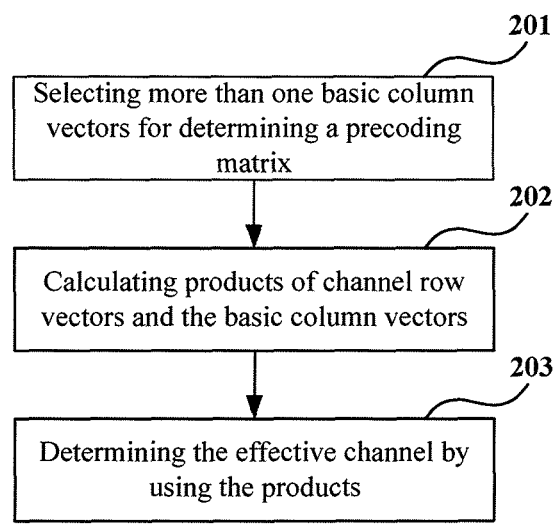
FIG. 2 is a flowchart of the method for determining an effective channel in accordance with the first embodiment of the present invention.

FIG. 2 is a flowchart of the method for determining an effective channel in accordance with the first embodiment of the present invention. As shown in FIG. 2, the method comprises:

Step 201: selecting more than one basic column vectors for determining a precoding matrix;

in this embodiment, for a 4×4 MIMO system, an RI corresponds to 16 precoding matrixes, and the basic column vectors are used for determining a precoding matrix;

the precoding matrix may be expressed as $W_n^{(l)}$, where, n denotes a codebook index, n=0~15, and l denotes a rank, l=1~4;

a matrix $G_n=I_4-2u_n u_n^H/u_n^H u_n$ is defined, and $G_n^{\{s\}}$ denotes a matrix composed of a set {s} of the columns of the matrix $G_n$; where, $u_n$ is as shown in Table 1. The matrix $G_n$ is referred to as a parent codebook of the codebook index n, and $W_n^{(l)}$ may be expressed as shown in Table 1.

It can be seen from Table 1 that is the precoding matrix $W_n^{(l)}$ is composed of the column vectors of the parent codebook $G_n$. Therefore, the basic column vectors of the precoding matrix $W_n^{(l)}$ are the basic column vectors of the parent codebook $G_n$, that is, the precoding matrix $W_n^{(l)}$ is determined by the basic column vectors. And the parent codebook $G_n$ may be constructed by the basic column vectors.

For example, basic column vectors $\phi_m$ when the codebook indices n=0~3 and 8~15 are listed in Table 2, where in is a positive integer, and m=0~11; parent codebooks constructed using the basic column vectors in Table 2 are listed in Table 3; basic column vectors $\phi_m$ when the codebook n=4~7 are listed in Table 4, where, m=0~7; and parent codebooks constructed using the basic column vectors in Table 4 are listed in Table 5.

TABLE 2

| Codebook indices 0~3 and 8~15 | |
|---|---|
| $\phi_0 = \frac{1}{2}[1, 1, 1, 1]^T$ | $\phi_1 = \frac{1}{2}[1, 1, -1, -1]^T$ |
| $\phi_2 = \frac{1}{2}[1, -1, 1, -1]^T$ | $\phi_3 = \frac{1}{2}[1, -1, -1, 1]^T$ |
| $\phi_4 = \frac{1}{2}[1, j, -1, -j]^T$ | $\phi_5 = \frac{1}{2}[-j, 1, -j, 1]^T$ |
| $\phi_6 = \frac{1}{2}[-1, j, 1, -j]^T$ | $\phi_7 = \frac{1}{2}[j, 1, j, 1]^T$ |
| $\phi_8 = \frac{1}{2}[1, 1, 1, -1]^T$ | $\phi_9 = \frac{1}{2}[1, 1, -1, 1]^T$ |
| $\phi_{10} = \frac{1}{2}[1, -1, 1, 1]^T$ | $\phi_{11} = \frac{1}{2}[-1, 1, 1, 1]^T$ |

TABLE 1

| | | Rank index l | | | |
|---|---|---|---|---|---|
| Codebook | $u_n$ | 1 $W_n^{(1)}$ | 2 $W_n^{(2)}$ | 3 $W_n^{(3)}$ | 4 $W_n^{(4)}$ |
| 0 | $u_0 = [1\ -1\ -1\ -1]^T$ | $G_0^{\{1\}}$ | $G_0^{\{14\}}/\sqrt{2}$ | $G_0^{\{124\}}/\sqrt{3}$ | $G_0^{\{1234\}}/2$ |
| 1 | $u_1 = [1\ -j\ 1\ j]^T$ | $G_1^{\{1\}}$ | $G_1^{\{12\}}/\sqrt{2}$ | $G_1^{\{123\}}/\sqrt{3}$ | $G_1^{\{1234\}}/2$ |
| 2 | $u_2 = [1\ 1\ -1\ 1]^T$ | $G_2^{\{1\}}$ | $G_2^{\{12\}}/\sqrt{2}$ | $G_2^{\{123\}}/\sqrt{3}$ | $G_2^{\{3214\}}/2$ |
| 3 | $u_3 = [1\ j\ 1\ -j]^T$ | $G_3^{\{1\}}$ | $G_3^{\{12\}}/\sqrt{2}$ | $G_3^{\{123\}}/\sqrt{3}$ | $G_3^{\{3214\}}/2$ |
| 4 | $u_4 = [1\ (-1-j)/\sqrt{2}\ -j\ (1-j)/\sqrt{2}]^T$ | $G_4^{\{1\}}$ | $G_4^{\{14\}}/\sqrt{2}$ | $G_4^{\{124\}}/\sqrt{3}$ | $G_4^{\{1234\}}/2$ |
| 5 | $u_5 = [1\ (1-j)/\sqrt{2}\ j\ (-1-j)/\sqrt{2}]^T$ | $G_5^{\{1\}}$ | $G_5^{\{14\}}/\sqrt{2}$ | $G_5^{\{124\}}/\sqrt{3}$ | $G_5^{\{1234\}}/2$ |
| 6 | $u_6 = [1\ (1+j)/\sqrt{2}\ -j\ (-1+j)/\sqrt{2}]^T$ | $G_6^{\{1\}}$ | $G_6^{\{13\}}/\sqrt{2}$ | $G_6^{\{134\}}/\sqrt{3}$ | $G_6^{\{1324\}}/2$ |
| 7 | $u_7 = [1\ (-1+j)/\sqrt{2}\ j\ (1+j)/\sqrt{2}]^T$ | $G_7^{\{1\}}$ | $G_7^{\{13\}}/\sqrt{2}$ | $G_7^{\{134\}}/\sqrt{3}$ | $G_7^{\{1324\}}/2$ |
| 8 | $u_8 = [1\ -1\ 1\ 1]^T$ | $G_8^{\{1\}}$ | $G_8^{\{12\}}/\sqrt{2}$ | $G_8^{\{124\}}/\sqrt{3}$ | $G_8^{\{1234\}}/2$ |
| 9 | $u_9 = [1\ -j\ -1\ -j]^T$ | $G_9^{\{1\}}$ | $G_9^{\{14\}}/\sqrt{2}$ | $G_9^{\{134\}}/\sqrt{3}$ | $G_9^{\{1234\}}/2$ |
| 10 | $u_{10} = [1\ 1\ 1\ -1]^T$ | $G_{10}^{\{1\}}$ | $G_{10}^{\{13\}}/\sqrt{2}$ | $G_{10}^{\{123\}}/\sqrt{3}$ | $G_{10}^{\{1324\}}/2$ |
| 11 | $u_{11} = [1\ j\ -1\ j]^T$ | $G_{11}^{\{1\}}$ | $G_{11}^{\{13\}}/\sqrt{2}$ | $G_{11}^{\{134\}}/\sqrt{3}$ | $G_{11}^{\{1324\}}/2$ |
| 12 | $u_{12} = [1\ -1\ -1\ 1]^T$ | $G_{12}^{\{1\}}$ | $G_{12}^{\{12\}}/\sqrt{2}$ | $G_{12}^{\{123\}}/\sqrt{3}$ | $G_{12}^{\{1234\}}/2$ |
| 13 | $u_{13} = [1\ -1\ 1\ -1]^T$ | $G_{13}^{\{1\}}$ | $G_{13}^{\{13\}}/\sqrt{2}$ | $G_{13}^{\{123\}}/\sqrt{3}$ | $G_{13}^{\{1324\}}/2$ |
| 14 | $u_{14} = [1\ 1\ -1\ -1]^T$ | $G_{14}^{\{1\}}$ | $G_{14}^{\{13\}}/\sqrt{2}$ | $G_{14}^{\{123\}}/\sqrt{3}$ | $G_{14}^{\{3214\}}/2$ |
| 15 | $u_{15} = [1\ 1\ 1\ 1]^T$ | $G_{15}^{\{1\}}$ | $G_{15}^{\{12\}}/\sqrt{2}$ | $G_{15}^{\{123\}}/\sqrt{3}$ | $G_{15}^{\{1234\}}/2$ |

TABLE 3

Codebook Indices 0~3 and 8~15

$G_0 = [\phi_0\ \phi_1\ \phi_2\ \phi_3]$  $G_1 = [\phi_4\ \phi_5\ \phi_6\ \phi_7]$  $G_2 = [\phi_2\ -\phi_3\ \phi_0\ -\phi_1]$  $G_3 = [-\phi_6\ \phi_7\ -\phi_4\ \phi_5]$
$G_8 = [\phi_1\ \phi_0\ -\phi_3\ -\phi_2]$  $G_9 = [j\phi_5\ -j\phi_4\ -j\phi_7\ j\phi_6]$  $G_{10} = [\phi_3\ -\phi_2\ -\phi_1\ \phi_0]$  $G_{11} = [-j\phi_7\ -j\phi_6\ j\phi_5\ j\phi_4]$
$G_{12} = [\phi_8\ \phi_9\ \phi_{10}\ \phi_{11}]$  $G_{13} = [\phi_9\ \phi_8\ \phi_{11}\ \phi_{10}]$  $G_{14} = [\phi_{10}\ \phi_{11}\ \phi_8\ \phi_9]$  $G_{15} = [-\phi_{11}\ -\phi_{10}\ -\phi_9\ -\phi_8]$

TABLE 4

Codebook indices 4~7

$\varphi_0 = \frac{1}{2}\left[1,\ \frac{1+j}{\sqrt{2}},\ j,\ \frac{-1+j}{\sqrt{2}}\right]^T$  $\varphi_1 = \frac{1}{2}\left[\frac{1-j}{\sqrt{2}},\ 1,\ \frac{-1-j}{\sqrt{2}},\ -j\right]^T$ $\varphi_2 = \frac{1}{2}\left[-j,\ \frac{-1+j}{\sqrt{2}},\ 1,\ \frac{-1-j}{\sqrt{2}}\right]^T$  $\varphi_3 = \frac{1}{2}\left[\frac{-1-j}{\sqrt{2}},\ j,\ \frac{-1+j}{\sqrt{2}},\ 1\right]^T$ $\varphi_4 = \frac{1}{2}\left[1,\ \frac{-1+j}{\sqrt{2}},\ -j,\ \frac{1+j}{\sqrt{2}}\right]^T$  $\varphi_5 = \frac{1}{2}\left[\frac{-1-j}{\sqrt{2}},\ 1,\ \frac{1-j}{\sqrt{2}},\ j\right]^T$ $\varphi_6 = \frac{1}{2}\left[j,\ \frac{1+j}{\sqrt{2}},\ 1,\ \frac{1-j}{\sqrt{2}}\right]^T$  $\varphi_7 = \frac{1}{2}\left[\frac{1-j}{\sqrt{2}},\ j,\ \frac{1+j}{\sqrt{2}},\ 1\right]^T$

TABLE 5

Codebook indices 4~7

$G_4 = [\phi_0\ \phi_1\ \phi_2\ \phi_3]$  $G_5 = [\phi_4\ \phi_5\ \phi_6\ \phi_7]$  $G_6 = [j\phi_2\ -j\phi_3\ -j\phi_0\ j\phi_1]$  $G_7 = [-j\phi_6\ j\phi_7\ j\phi_4\ -j\phi_5]$ It can be seen from above that precoding matrixes can be constructed according to different codebook indices by using the basic column vectors in Table 2 or 4, relationship between parent codebooks in Table 3 or 5 and the basic column vectors, and relationship between the precoding matrixes in Table 1 and the column vectors of the parent codebooks.

Step 202: calculating products of channel row vectors and the basic column vectors.

In this embodiment, H denotes a channel matrix which may be denoted by a row vector, the row vector being expressed as $H_i=[H_{i,1}\ H_{i,2}\ H_{i,3}\ H_{i,4}]$, where, $H_i$ denotes a channel vector to which the ith receiving antenna corresponds, i=1~4, the row vector of the channel is expressed by the formula below:

$$H = \begin{bmatrix} H_1 \\ H_2 \\ H_3 \\ H_4 \end{bmatrix} \quad (5)$$

Hence, products of the row vector $\{H_i\}_{i=1}$ of the matrix and the basic column vectors may be expressed as $H_i\phi_m$ or $H_i\varphi_m$. The basic column vectors $\phi_m$, $\varphi_m$ are as shown in Tables 2 and 4, the products $H_i\phi_m$ or $H_i\varphi_m$ may be obtained easily.

Step 203: determining the effective channel by using the products $H_i\phi_m$ or $H_i\varphi_m$ obtained in step 202.

In this embodiment, the effective channel is expressed as $HW_n^{(l)}$; where, the rank l=1~4, and the codebook indices are n=0~15, and the effective channel matrixes are expressed as:

$$HW_n^{(l)} = \begin{bmatrix} H_1 \\ H_2 \\ H_3 \\ H_4 \end{bmatrix} \cdot \lambda_l \left[ G_n^{\{k_1\}},\ G_n^{\{k_2\}},\ \ldots,\ G_n^{\{k_l\}} \right] \quad (6)$$

$$= \lambda_l \begin{bmatrix} H_1 G_n^{\{k_1\}} & H_1 G_n^{\{k_2\}} & \ldots & H_1 G_n^{\{k_l\}} \\ H_2 G_n^{\{k_1\}} & H_2 G_n^{\{k_2\}} & \ldots & H_2 G_n^{\{k_l\}} \\ \vdots & \vdots & \ddots & \vdots \\ H_4 G_n^{\{k_1\}} & H_4 G_n^{\{k_2\}} & \ldots & H_4 G_n^{\{k_l\}} \end{bmatrix}$$

In the above formula (6), $$\lambda_l = \begin{cases} 1, & l = 1 \\ \frac{1}{\sqrt{2}}, & l = 2 \\ \frac{1}{\sqrt{3}}, & l = 3 \\ \frac{1}{2}, & l = 4 \end{cases} \quad (7)$$

Therefore, the effective channel $HW_n^{(l)}$ may be obtained only if $H_i G_n^{\{k_m\}}$ is obtained, and the product $H_i G_n^{\{k_m\}}$ may be determined according to the product $H_i\phi_i$ or $H_i\varphi_i$, obtained in step 202, where, $k_m$ denotes a serial number of a column of the matrix, from 1 to l.

It can be seen from the above embodiment that for a 4×4 MIMO system, the precoding matrix may be composed of 20 basic column vectors (as shown in Tables 2 and 4), hence, the effective channel matrix $HW_n^{(l)}$ is obtained by respectively calculating products of each channel vector $H_i$ and the 20 basic column vectors. Such a method is simple with a small amount of calculation, and lowers the calculation complexity, thereby lowering the power consumption of the equipment, and reducing the circuit size needed in performing corresponding processing. And the above method is not only applicable to a 4×4 MIMO system, but also to a 2×2 or 8×8 MIMO system.

In this embodiment, the parent codebook $G_n$ may be determined by directly using the basic column vectors, or by multiplying the basic column vectors by unit real numbers (1,−1) or unit imaginary numbers (j,−j), thereby determining the precoding matrix.

In another embodiment of the present invention, in order to further lower the amount of calculation, the inventors found in the implementation of the present invention that there exist same computational parts in the multiplication operation of the channel column vectors and the 20 basic column vectors. Therefore, in these cases, these same computational parts may be performed first, and then the product $H_i\phi_m$, or $H_i\varphi_m$ may be calculated by using the results of these operations, thereby further lowering the complexity of calculation.

In these cases, when there exist same computational parts in the products of the channel column vectors and the basic column vectors, step 202 may further comprise: calculating the same computational parts; and calculating the products of the channel row vectors and the basic column vectors by using the same computational parts. In this way, the calculation amount may be further lowered, the calculation is simplified, thereby further lowering the power consumption of the equipment, and reducing the circuit size needed in performing corresponding processing.

For example, for a 4×4 MIMO system, there exist 24 same computational parts, as shown in Table 6, and the values of the product $H_i\phi_m$ or $H_i\phi_m$ are 20 complex values, as shown in Tables 7 and 8.

First, the same computational parts may be calculated in advance, which is shown in Table 6. And then, the product $H_i\phi_m$ or $H_i\phi_m$ of the channel row vectors and the basic column vectors is calculated according to the same computational parts, as shown in Tables 7 and 8.

TABLE 6

| Serial number | Codebooks 0~3 and 8~15 | Codebooks 4~7 | Codebooks 4~7 |
|---|---|---|---|
| 1 | $A_i = \frac{1}{2}(\text{Re}\{H_{i,1}\} + \text{Re}\{H_{i,3}\})$ | $I_i = \frac{1}{2}(\text{Re}\{H_{i,1}\} + \text{Im}\{H_{i,3}\})$ | $Q_i = \frac{1}{\sqrt{2}}(F_i - G_i)$ |
| 2 | $B_i = \frac{1}{2}(\text{Re}\{H_{i,1}\} + \text{Re}\{H_{i,3}\})$ | $J_i = \frac{1}{2}(\text{Re}\{H_{i,1}\} - \text{Im}\{H_{i,3}\})$ | $R_i = \frac{1}{\sqrt{2}}(E_i + H_i)$ |
| 3 | $C_i = \frac{1}{2}(\text{Im}\{H_{i,1}\} + \text{Im}\{H_{i,3}\})$ | $K_i = \frac{1}{2}(\text{Im}\{H_{i,1}\} + \text{Re}\{H_{i,3}\})$ | $S_i = \frac{1}{\sqrt{2}}(B_i + C_i)$ |
| 4 | $D_i = \frac{1}{2}(\text{Im}\{H_{i,1}\} - \text{Im}\{H_{i,3}\})$ | $L_i = \frac{1}{2}(\text{Im}\{H_{i,1}\} - \text{Re}\{H_{i,3}\})$ | $T_i = \frac{1}{\sqrt{2}}(A_i - D_i)$ |
| 5 | $E_i = \frac{1}{2}(\text{Re}\{H_{i,2}\} + \text{Re}\{H_{i,4}\})$ | $M_i = \frac{1}{2}(\text{Re}\{H_{i,2}\} + \text{Im}\{H_{i,4}\})$ | $U_i = \frac{1}{\sqrt{2}}(F_i + G_i)$ |
| 6 | $F_i = \frac{1}{2}(\text{Re}\{H_{i,2}\} - \text{Re}\{H_{i,4}\})$ | $N_i = \frac{1}{2}(\text{Re}\{H_{i,2}\} - \text{Im}\{H_{i,4}\})$ | $V_i = \frac{1}{\sqrt{2}}(E_i - H_i)$ |
| 7 | $G_i = \frac{1}{2}(\text{Im}\{H_{i,2}\} + \text{Im}\{H_{i,4}\})$ | $O_i = \frac{1}{2}(\text{Im}\{H_{i,2}\} + \text{Re}\{H_{i,4}\})$ | $W_i = \frac{1}{\sqrt{2}}(B_i - C_i)$ |
| 8 | $H_i = \frac{1}{2}(\text{Im}\{H_{i,2}\} - \text{Im}\{H_{i,4}\})$ | $P_i = \frac{1}{2}(\text{Im}\{H_{i,2}\} - \text{Re}\{H_{i,4}\})$ | $X_i = \frac{1}{\sqrt{2}}(A_i + D_i)$ |

TABLE 7

| Codebooks 0~3 and 8~15 | | |
|---|---|---|
| $H_i\phi_0$ | Re{·} | $A_i + E_i$ |
| | Im{·} | $C_i + G_i$ |
| $H_i\phi_1$ | Re{·} | $B_i + F_i$ |
| | Im{·} | $D_i + H_i$ |
| $H_i\phi_2$ | Re{·} | $A_i - E_i$ |
| | Im{·} | $C_i - G_i$ |
| $H_i\phi_3$ | Re{·} | $B_i - F_i$ |
| | Im{·} | $D_i - H_i$ |
| $H_i\phi_4$ | Re{·} | $B_i - H_i$ |
| | Im{·} | $D_i + F_i$ |
| $H_i\phi_5$ | Re{·} | $C_i + E_i$ |
| | Im{·} | $-A_i + G_i$ |
| $H_i\phi_6$ | Re{·} | $-B_i - H_i$ |
| | Im{·} | $-D_i + F_i$ |
| $H_i\phi_7$ | Re{·} | $-C_i + E_i$ |
| | Im{·} | $A_i + G_i$ |
| $H_i\phi_8$ | Re{·} | $A_i + F_i$ |
| | Im{·} | $C_i + H_i$ |
| $H_i\phi_9$ | Re{·} | $B_i + E_i$ |
| | Im{·} | $D_i + G_i$ |

TABLE 7-continued

| Codebooks 0~3 and 8~15 | | |
|---|---|---|
| $H_i\phi_{10}$ | Re{·} | $A_i - F_i$ |
| | Im{·} | $C_i - H_i$ |
| $H_i\phi_{11}$ | Re{·} | $-B_i + E_i$ |
| | Im{·} | $-D_i + G_i$ |

TABLE 8

| Codebooks 4~7 | | |
|---|---|---|
| $H_i\phi_0$ | Re{·} | $J_i + Q_i$ |
| | Im{·} | $K_i + R_i$ |
| $H_i\phi_1$ | Re{·} | $M_i + S_i$ |
| | Im{·} | $P_i - T_i$ |

TABLE 8-continued

| Codebooks 4~7 | | |
|---|---|---|
| $H_i\phi_2$ | Re{·} | $K_i - R_i$ |
| | Im{·} | $-J_i + Q_i$ |
| $H_i\phi_3$ | Re{·} | $-P_i - T_i$ |
| | Im{·} | $M_i - S_i$ |
| $H_i\phi_4$ | Re{·} | $I_i - U_i$ |
| | Im{·} | $L_i - V_i$ |
| $H_i\phi_5$ | Re{·} | $N_i - W_i$ |
| | Im{·} | $O_i - X_i$ |
| $H_i\phi_6$ | Re{·} | $-L_i + V_i$ |
| | Im{·} | $I_i + U_i$ |
| $H_i\phi_7$ | Re{·} | $O_i + X_i$ |
| | Im{·} | $-N_i - W_i$ |

It can be seen from the above embodiment that the 24 same computational parts may be calculated in advance, and then the product of the channel row vectors and the basic column vectors is calculated by using the same computational parts, as shown in Tables 7 and 8. In this way, the calculation is further simplified, thereby further lowering the power consumption of the equipment, and reducing the circuit size needed in performing corresponding processing.

Figure 3:
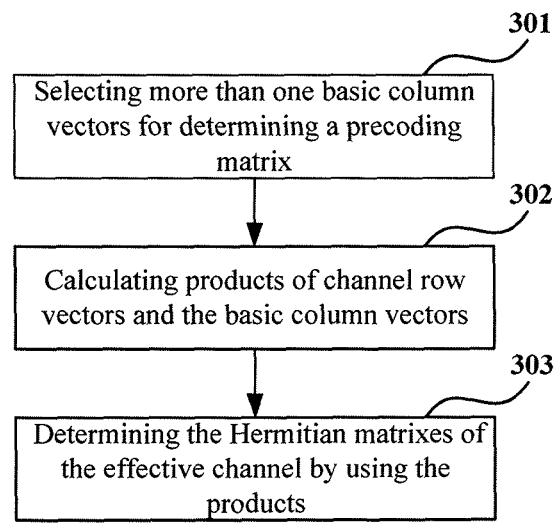
FIG. 3 is a flowchart of the method for determining a Hermitian matrix of an effective channel in accordance with the second embodiment of the present invention.

FIG. 3 is a flowchart of the method for determining a Hermitian matrix of an effective channel in accordance with the second embodiment of the present invention.

In this embodiment, as described above, the Hermitian matrix of the effective channel may be $(HW_n^{(l)})^H HW_n^{(l)}$ or $(HW_n^{(l)})^H HW_n^{(l)} + \sigma_n^2 I_l$. Therefore, it can be seen that only $(HW_n^{(l)})^H HW_n^{(l)}$ needs to be calculated.

As shown in FIG. 3, in determining the effective Hermitian matrix $(HW_n^{(l)})^H HW_n^{(l)}$, the method comprises:

Steps 301 and 302: similar to steps 201 and 202 of the first embodiment, which shall not be described any further;

Step 303: obtaining the Hermitian matrix of the effective channel by using the products obtained in step 302;

In this embodiment, the Hermitian matrix of the effective channel may be expressed as $(HW_n^{(l)})^H HW_n^{(l)}$; where, $(HW_n^{(l)})^H$ denotes permutation of the effective channel. According to Table 1, the Hermitian matrix of the effective channel is expressed by the formula below:

$$(HW_n^{(l)})^H HW_n^{(l)} = \lambda_l^2 \cdot \begin{bmatrix} \sum_{i=1}^{4} |H_i G_n^{\{k_1\}}|^2 & \sum_{i=1}^{4} (H_i G_n^{\{k_1\}})^* H_i G_n^{\{k_2\}} & \cdots & \sum_{i=1}^{4} (H_i G_n^{\{k_1\}})^* H_i G_n^{\{k_l\}} \\ \sum_{i=1}^{4} (H_i G_n^{\{k_2\}})^* H_i G_n^{\{k_1\}} & \sum_{i=1}^{4} |H_i G_n^{\{k_2\}}|^2 & \cdots & \sum_{i=1}^{4} (H_i G_n^{\{k_2\}})^* H_i G_n^{\{k_l\}} \\ \vdots & \vdots & \ddots & \vdots \\ \sum_{i=1}^{4} (H_i G_n^{\{k_l\}})^* H_i G_n^{\{k_1\}} & \sum_{i=1}^{4} (H_i G_n^{\{k_l\}})^* H_i G_n^{\{k_2\}} & \cdots & \sum_{i=1}^{4} |H_i G_n^{\{k_l\}}|^2 \end{bmatrix} \quad (8)$$

Therefore, the Hermitian matrix $(HW_n^{(l)})^H HW_n^{(l)}$ of the effective channel may be obtained only if $H_i G_n^{\{k_m\}}$ is obtained, and the product $H_i G_n^{\{k_m\}}$ may be determined according to the product $H_i \phi_m$ or $H_i \phi_m$ obtained in steps 202 and 302.

In order to further simplify the calculation, the inventors observed the Hermitian matrix of the effective channel carefully and found that the Hermitian matrix of the effective channel is composed of several elements. Therefore, all the Hermitian matrixes of the effective channel may be obtained by calculating the several elements.

For example, for a 4×4 MIMO system, the inventors observed the Hermitian matrix of the effective channel carefully and found that total 16×4=64 Hermitian matrixes of the effective channel are composed of 50 elements. Therefore, all the elements of the Hermitian matrixes of the effective channel may be obtained by calculating the 50 elements.

The values of the 50 elements are shown in Tables 9 and 10 below, and the Hermitian matrixes of the effective channel that are obtained by using the values shown in Tables 9 and 10 are shown in Table 11.

TABLE 9

Codebooks 0~3 and 8~15

$\alpha_0 = \sum_{i=1}^{4} |H_i \phi_0|^2 \qquad \alpha_1 = \sum_{i=1}^{4} (H_i \phi_0)^* (H_i \phi_1)$ $\alpha_2 = \sum_{i=1}^{4} (H_i \phi_0)^* (H_i \phi_2) \qquad \alpha_3 = \sum_{i=1}^{4} (H_i \phi_0)^* (H_i \phi_3)$ TABLE 9-continued Codebooks 0~3 and 8~15

$\alpha_4 = \sum_{i=1}^{4} |H_i \phi_1|^2 \qquad \alpha_5 = \sum_{i=1}^{4} (H_i \phi_1)^* (H_i \phi_2)$ $\alpha_6 = \sum_{i=1}^{4} (H_i \phi_1)^* (H_i \phi_3) \qquad \alpha_7 = \sum_{i=1}^{4} |H_i \phi_2|^2$ $\alpha_8 = \sum_{i=1}^{4} (H_i \phi_2)^* (H_i \phi_3) \qquad \alpha_9 = \sum_{i=1}^{4} |H_i \phi_3|^2$ $\alpha_{10} = \sum_{i=1}^{4} |H_i \phi_4|^2 \qquad \alpha_{11} = \sum_{i=1}^{4} (H_i \phi_4)^* (H_i \phi_5)$ TABLE 9-continued Codebooks 0~3 and 8~15

$\alpha_{12} = \sum_{i=1}^{4} (H_i \phi_4)^* (H_i \phi_6) \qquad \alpha_{13} = \sum_{i=1}^{4} (H_i \phi_4)^* (H_i \phi_7)$ $\alpha_{14} = \sum_{i=1}^{4} |H_i \phi_5|^2 \qquad \alpha_{15} = \sum_{i=1}^{4} (H_i \phi_5)^* (H_i \phi_6)$ $\alpha_{16} = \sum_{i=1}^{4} (H_i \phi_5)^* (H_i \phi_7) \qquad \alpha_{17} = \sum_{i=1}^{4} |H_i \phi_6|^2$ $\alpha_{18} = \sum_{i=1}^{4} (H_i \phi_6)^* (H_i \phi_7) \qquad \alpha_{19} = \sum_{i=1}^{4} |H_i \phi_7|^2$ $\alpha_{20} = \sum_{i=1}^{4} |H_i \phi_8|^2 \qquad \alpha_{21} = \sum_{i=1}^{4} (H_i \phi_8)^* (H_i \phi_9)$ $\alpha_{22} = \sum_{i=1}^{4} (H_i \phi_8)^* (H_i \phi_{10}) \qquad \alpha_{23} = \sum_{i=1}^{4} (H_i \phi_8)^* (H_i \phi_{11})$ $\alpha_{24} = \sum_{i=1}^{4} |H_i \phi_9|^2 \qquad \alpha_{25} = \sum_{i=1}^{4} (H_i \phi_9)^* (H_i \phi_{10})$ $\alpha_{26} = \sum_{i=1}^{4} (H_i \phi_9)^* (H_i \phi_{11}) \qquad \alpha_{27} = \sum_{i=1}^{4} |H_i \phi_{10}|^2$

TABLE 9-continued

Codebooks 0~3 and 8~15

$$\alpha_{28} = \sum_{i=1}^{4} (H_i\phi_{10})^*(H_i\phi_{11}) \qquad \alpha_{29} = \sum_{i=1}^{4} |H_i\phi_{11}|^2$$

TABLE 10

Codebooks 4~7

$$\beta_0 = \sum_{i=1}^{4} |H_i\varphi_0|^2 \qquad \beta_1 = \sum_{i=1}^{4} (H_i\varphi_0)^*(H_i\varphi_1)$$

$$\beta_2 = \sum_{i=1}^{4} (H_i\varphi_0)^*(H_i\varphi_2) \qquad \beta_3 = \sum_{i=1}^{4} (H_i\varphi_0)^*(H_i\varphi_3)$$

$$\beta_4 = \sum_{i=1}^{4} |H_i\varphi_1|^2 \qquad \beta_5 = \sum_{i=1}^{4} (H_i\varphi_1)^*(H_i\varphi_2)$$

$$\beta_6 = \sum_{i=1}^{4} (H_i\varphi_1)^*(H_i\varphi_3) \qquad \beta_7 = \sum_{i=1}^{4} |H_i\varphi_2|^2$$

TABLE 10-continued

Codebooks 4~7

$$\beta_8 = \sum_{i=1}^{4} (H_i\varphi_2)^*(H_i\varphi_3) \qquad \beta_9 = \sum_{i=1}^{4} |H_i\varphi_3|^2$$

$$\beta_{10} = \sum_{i=1}^{4} |H_i\varphi_4|^2 \qquad \beta_{11} = \sum_{i=1}^{4} (H_i\varphi_4)^*(H_i\varphi_5)$$

$$\beta_{12} = \sum_{i=1}^{4} (H_i\varphi_4)^*(H_i\varphi_6) \qquad \beta_{13} = \sum_{i=1}^{4} (H_i\varphi_4)^*(H_i\varphi_7)$$

$$\beta_{14} = \sum_{i=1}^{4} |H_i\varphi_5|^2 \qquad \beta_{15} = \sum_{i=1}^{4} (H_i\varphi_5)^*(H_i\varphi_6)$$

$$\beta_{16} = \sum_{i=1}^{4} (H_i\varphi_5)^*(H_i\varphi_7) \qquad \beta_{17} = \sum_{i=1}^{4} |H_i\varphi_6|^2$$

$$\beta_{18} = \sum_{i=1}^{4} (H_i\varphi_6)^*(H_i\varphi_7) \qquad \beta_{19} = \sum_{i=1}^{4} |H_i\varphi_7|^2$$

TABLE 11

Hermitian matrix $(HW_n^{(l)})^H HW_n^{(l)}$ of the effective channel

| Codebook index $n$ | Rank 1 | 2 | 3 | 4 |
|---|---|---|---|---|
| 0 | $\alpha_0$ | $\frac{1}{2}\begin{bmatrix} \alpha_0 & \alpha_3 \\ \alpha_3^* & \alpha_9 \end{bmatrix}$ | $\frac{1}{3}\begin{bmatrix} \alpha_0 & \alpha_1 & \alpha_3 \\ \alpha_1^* & \alpha_4 & \alpha_6 \\ \alpha_3^* & \alpha_6^* & \alpha_9 \end{bmatrix}$ | $\frac{1}{4}\begin{bmatrix} \alpha_0 & \alpha_1 & \alpha_2 & \alpha_3 \\ \alpha_1^* & \alpha_4 & \alpha_5 & \alpha_6 \\ \alpha_2^* & \alpha_5^* & \alpha_7 & \alpha_8 \\ \alpha_3^* & \alpha_6^* & \alpha_8^* & \alpha_9 \end{bmatrix}$ |
| 1 | $\alpha_{10}$ | $\frac{1}{2}\begin{bmatrix} \alpha_{10} & \alpha_{11} \\ \alpha_{11}^* & \alpha_{14} \end{bmatrix}$ | $\frac{1}{3}\begin{bmatrix} \alpha_{10} & \alpha_{11} & \alpha_{12} \\ \alpha_{11}^* & \alpha_{14} & \alpha_{15} \\ \alpha_{12}^* & \alpha_{15}^* & \alpha_{17} \end{bmatrix}$ | $\frac{1}{4}\begin{bmatrix} \alpha_{10} & \alpha_{11} & \alpha_{12} & \alpha_{13} \\ \alpha_{11}^* & \alpha_{14} & \alpha_{15} & \alpha_{16} \\ \alpha_{12}^* & \alpha_{15}^* & \alpha_{17} & \alpha_{18} \\ \alpha_{13}^* & \alpha_{16}^* & \alpha_{18}^* & \alpha_{19} \end{bmatrix}$ |
| 2 | $\alpha_7$ | $\frac{1}{2}\begin{bmatrix} \alpha_7 & -\alpha_8 \\ -\alpha_8^* & \alpha_9 \end{bmatrix}$ | $\frac{1}{3}\begin{bmatrix} \alpha_7 & -\alpha_8 & \alpha_2^* \\ -\alpha_8^* & \alpha_9 & -\alpha_3^* \\ \alpha_2 & -\alpha_3 & \alpha_0 \end{bmatrix}$ | $\frac{1}{4}\begin{bmatrix} \alpha_0 & -\alpha_3 & \alpha_2 & -\alpha_1 \\ -\alpha_3^* & \alpha_9 & -\alpha_8^* & \alpha_6^* \\ \alpha_2^* & -\alpha_8 & \alpha_7 & -\alpha_5^* \\ -\alpha_1^* & \alpha_6 & -\alpha_5 & \alpha_4 \end{bmatrix}$ |
| 3 | $\alpha_{17}$ | $\frac{1}{2}\begin{bmatrix} \alpha_{17} & -\alpha_{18} \\ -\alpha_{18}^* & \alpha_{19} \end{bmatrix}$ | $\frac{1}{3}\begin{bmatrix} \alpha_{17} & -\alpha_{18} & \alpha_{12}^* \\ -\alpha_{18}^* & \alpha_{19} & -\alpha_{13}^* \\ \alpha_{12} & -\alpha_{13} & \alpha_{10} \end{bmatrix}$ | $\frac{1}{4}\begin{bmatrix} \alpha_{10} & -\alpha_{13} & \alpha_{12} & -\alpha_{11} \\ -\alpha_{13}^* & \alpha_{19} & -\alpha_{18}^* & \alpha_{16}^* \\ \alpha_{12}^* & -\alpha_{18} & \alpha_{17} & -\alpha_{15}^* \\ -\alpha_{11}^* & \alpha_{16} & -\alpha_{15} & \alpha_{14} \end{bmatrix}$ |
| 4 | $\beta_0$ | $\frac{1}{2}\begin{bmatrix} \beta_0 & \beta_3 \\ \beta_3^* & \beta_9 \end{bmatrix}$ | $\frac{1}{3}\begin{bmatrix} \beta_0 & \beta_1 & \beta_3 \\ \beta_1^* & \beta_4 & \beta_6 \\ \beta_3^* & \beta_6^* & \beta_9 \end{bmatrix}$ | $\frac{1}{4}\begin{bmatrix} \beta_0 & \beta_1 & \beta_2 & \beta_3 \\ \beta_1^* & \beta_4 & \beta_5 & \beta_6 \\ \beta_2^* & \beta_5^* & \beta_7 & \beta_8 \\ \beta_3^* & \beta_6^* & \beta_8^* & \beta_9 \end{bmatrix}$ |
| 5 | $\beta_{10}$ | $\frac{1}{2}\begin{bmatrix} \beta_{10} & \beta_{13} \\ \beta_{13}^* & \beta_{19} \end{bmatrix}$ | $\frac{1}{3}\begin{bmatrix} \beta_{10} & \beta_{11} & \beta_{13} \\ \beta_{11}^* & \beta_{14} & \beta_{16} \\ \beta_{13}^* & \beta_{16}^* & \beta_{19} \end{bmatrix}$ | $\frac{1}{4}\begin{bmatrix} \beta_{10} & \beta_{11} & \beta_{12} & \beta_{13} \\ \beta_{11}^* & \beta_{14} & \beta_{15} & \beta_{16} \\ \beta_{12}^* & \beta_{15}^* & \beta_{17} & \beta_{18} \\ \beta_{13}^* & \beta_{16}^* & \beta_{18}^* & \beta_{19} \end{bmatrix}$ |

TABLE 11-continued

| | Hermitian matrix $(HW_n^{(l)})^H HW_n^{(l)}$ of the effective channel | | | |
|---|---|---|---|---|
| Codebook | | Rank l | | |
| index $n$ | 1 | 2 | 3 | 4 |
| 6 | $\beta_7$ | $\dfrac{1}{2}\begin{bmatrix} \beta_7 & -\beta_2^* \\ -\beta_2 & \beta_0 \end{bmatrix}$ | $\dfrac{1}{3}\begin{bmatrix} \beta_7 & -\beta_2^* & \beta_5^* \\ -\beta_2 & \beta_0 & -\beta_1 \\ \beta_5 & -\beta_1^* & \beta_4 \end{bmatrix}$ | $\dfrac{1}{4}\begin{bmatrix} \beta_7 & -\beta_2^* & -\beta_8 & \beta_5^* \\ -\beta_2 & \beta_0 & \beta_3 & -\beta_1 \\ -\beta_8^* & \beta_3^* & \beta_9 & -\beta_6^* \\ \beta_5 & -\beta_1^* & -\beta_6 & \beta_4 \end{bmatrix}$ |
| 7 | $\beta_{17}$ | $\dfrac{1}{2}\begin{bmatrix} \beta_{17} & -\beta_{12}^* \\ -\beta_{12} & \beta_{10} \end{bmatrix}$ | $\dfrac{1}{3}\begin{bmatrix} \beta_{17} & -\beta_{12}^* & \beta_{15}^* \\ -\beta_{12} & \beta_{10} & -\beta_{11} \\ \beta_{15} & -\beta_{11}^* & \beta_{14} \end{bmatrix}$ | $\dfrac{1}{4}\begin{bmatrix} \beta_{17} & -\beta_{12}^* & -\beta_{18} & \beta_{15}^* \\ -\beta_{12} & \beta_{10} & \beta_{13} & -\beta_{11} \\ -\beta_{18}^* & \beta_{13}^* & \beta_{19} & -\beta_{16}^* \\ \beta_{15} & -\beta_{11}^* & -\beta_{16} & \beta_{14} \end{bmatrix}$ |
| 8 | $\beta_4$ | $\dfrac{1}{2}\begin{bmatrix} \alpha_4 & \alpha_1^* \\ \alpha_1 & \alpha_0 \end{bmatrix}$ | $\dfrac{1}{3}\begin{bmatrix} \alpha_4 & \alpha_1^* & -\alpha_5 \\ \alpha_1 & \alpha_0 & -\alpha_2 \\ -\alpha_5^* & -\alpha_2^* & \alpha_7 \end{bmatrix}$ | $\dfrac{1}{4}\begin{bmatrix} \alpha_4 & \alpha_1^* & -\alpha_6 & -\alpha_5 \\ \alpha_1 & \alpha_0 & -\alpha_3 & -\alpha_2 \\ -\alpha_6^* & -\alpha_3^* & \alpha_9 & \alpha_8^* \\ -\alpha_5^* & -\alpha_2^* & \alpha_8 & \alpha_7 \end{bmatrix}$ |
| 9 | $\beta_{14}$ | $\dfrac{1}{2}\begin{bmatrix} \alpha_{14} & \alpha_{15} \\ \alpha_{15}^* & \alpha_{17} \end{bmatrix}$ | $\dfrac{1}{3}\begin{bmatrix} \alpha_{14} & -\alpha_{16} & \alpha_{15} \\ -\alpha_{16}^* & \alpha_{19} & -\alpha_{18} \\ \alpha_{15}^* & -\alpha_{18} & \alpha_{17} \end{bmatrix}$ | $\dfrac{1}{4}\begin{bmatrix} \alpha_{14} & -\alpha_{11}^* & -\alpha_{16} & \alpha_{15} \\ -\alpha_{11} & \alpha_{10} & \alpha_{13} & -\alpha_{12} \\ -\alpha_{16}^* & \alpha_{13}^* & \alpha_{19} & -\alpha_{18} \\ \alpha_{15}^* & -\alpha_{12}^* & -\alpha_{18} & \alpha_{17} \end{bmatrix}$ |
| 10 | $\beta_9$ | $\dfrac{1}{2}\begin{bmatrix} \alpha_9 & -\alpha_6^* \\ -\alpha_6 & \alpha_4 \end{bmatrix}$ | $\dfrac{1}{3}\begin{bmatrix} \alpha_9 & -\alpha_8^* & -\alpha_6^* \\ -\alpha_8 & \alpha_7 & \alpha_5 \\ -\alpha_6 & \alpha_5 & \alpha_4 \end{bmatrix}$ | $\dfrac{1}{4}\begin{bmatrix} \alpha_9 & -\alpha_6^* & -\alpha_8^* & \alpha_3^* \\ -\alpha_6 & \alpha_4 & \alpha_5 & -\alpha_1^* \\ -\alpha_8 & \alpha_5^* & \alpha_7 & -\alpha_2^* \\ \alpha_3 & -\alpha_1 & -\alpha_2 & \alpha_0 \end{bmatrix}$ |
| 11 | $\beta_{19}$ | $\dfrac{1}{2}\begin{bmatrix} \alpha_{19} & -\alpha_{16}^* \\ -\alpha_{16} & \alpha_{14} \end{bmatrix}$ | $\dfrac{1}{3}\begin{bmatrix} \alpha_{19} & -\alpha_{16}^* & -\alpha_{13}^* \\ -\alpha_{16} & \alpha_{14} & \alpha_{11}^* \\ -\alpha_{13} & \alpha_{11} & \alpha_{10} \end{bmatrix}$ | $\dfrac{1}{4}\begin{bmatrix} \alpha_{19} & -\alpha_{16}^* & \alpha_{18}^* & -\alpha_{13}^* \\ -\alpha_{16} & \alpha_{14} & -\alpha_{15} & \alpha_{11}^* \\ \alpha_{18} & -\alpha_{15} & \alpha_{17} & -\alpha_{12}^* \\ -\alpha_{13} & \alpha_{11} & -\alpha_{12} & \alpha_{10} \end{bmatrix}$ |
| 12 | $\beta_{20}$ | $\dfrac{1}{2}\begin{bmatrix} \alpha_{20} & \alpha_{21} \\ \alpha_{21}^* & \alpha_{24} \end{bmatrix}$ | $\dfrac{1}{3}\begin{bmatrix} \alpha_{20} & \alpha_{21} & \alpha_{22} \\ \alpha_{21}^* & \alpha_{24} & \alpha_{25} \\ \alpha_{22}^* & \alpha_{25}^* & \alpha_{27} \end{bmatrix}$ | $\dfrac{1}{4}\begin{bmatrix} \alpha_{20} & \alpha_{21} & \alpha_{22} & \alpha_{23} \\ \alpha_{21}^* & \alpha_{24} & \alpha_{25} & \alpha_{26} \\ \alpha_{22}^* & \alpha_{25}^* & \alpha_{27} & \alpha_{28} \\ \alpha_{23}^* & \alpha_{26}^* & \alpha_{28}^* & \alpha_{29} \end{bmatrix}$ |
| 13 | $\beta_{24}$ | $\dfrac{1}{2}\begin{bmatrix} \alpha_{24} & \alpha_{26} \\ \alpha_{26}^* & \alpha_{29} \end{bmatrix}$ | $\dfrac{1}{3}\begin{bmatrix} \alpha_{24} & \alpha_{21}^* & \alpha_{26} \\ \alpha_{21} & \alpha_{20} & \alpha_{23} \\ \alpha_{26}^* & \alpha_{23}^* & \alpha_{29} \end{bmatrix}$ | $\dfrac{1}{4}\begin{bmatrix} \alpha_{24} & \alpha_{26} & \alpha_{21}^* & \alpha_{25} \\ \alpha_{26}^* & \alpha_{29} & \alpha_{23}^* & \alpha_{28} \\ \alpha_{21} & \alpha_{23} & \alpha_{20} & \alpha_{22} \\ \alpha_{25}^* & \alpha_{28} & \alpha_{22}^* & \alpha_{27} \end{bmatrix}$ |
| 14 | $\beta_{27}$ | $\dfrac{1}{2}\begin{bmatrix} \alpha_{27} & \alpha_{22}^* \\ \alpha_{22} & \alpha_{20} \end{bmatrix}$ | $\dfrac{1}{3}\begin{bmatrix} \alpha_{27} & \alpha_{28} & \alpha_{22}^* \\ \alpha_{28}^* & \alpha_{29} & \alpha_{23} \\ \alpha_{22} & \alpha_{23} & \alpha_{20} \end{bmatrix}$ | $\dfrac{1}{4}\begin{bmatrix} \alpha_{20} & \alpha_{23} & \alpha_{22} & \alpha_{21} \\ \alpha_{23}^* & \alpha_{29} & \alpha_{28} & \alpha_{26} \\ \alpha_{22}^* & \alpha_{28} & \alpha_{27} & \alpha_{25} \\ \alpha_{21}^* & \alpha_{26} & \alpha_{25} & \alpha_{24} \end{bmatrix}$ |
| 15 | $\beta_{29}$ | $\dfrac{1}{2}\begin{bmatrix} \alpha_{29} & \alpha_{28}^* \\ \alpha_{28} & \alpha_{27} \end{bmatrix}$ | $\dfrac{1}{3}\begin{bmatrix} \alpha_{29} & \alpha_{28}^* & \alpha_{26}^* \\ \alpha_{28} & \alpha_{27} & \alpha_{25}^* \\ \alpha_{26} & \alpha_{25} & \alpha_{24} \end{bmatrix}$ | $\dfrac{1}{4}\begin{bmatrix} \alpha_{29} & \alpha_{28}^* & \alpha_{26}^* & \alpha_{23}^* \\ \alpha_{28} & \alpha_{27} & \alpha_{25}^* & \alpha_{22}^* \\ \alpha_{26} & \alpha_{25} & \alpha_{24} & \alpha_{21}^* \\ \alpha_{23} & \alpha_{22} & \alpha_{21} & \alpha_{20} \end{bmatrix}$ |

For a Hermitian matrix $(HW_n^{(l)})^H HW_n^{(l)} + \sigma_n^2 I_l$ of the effective channel, first, $(HW_n^{(l)})^H HW_n^{(l)}$ shown in Table 11 may be calculated by using the method above, and then $(HW_n^{(l)})^H HW_n^{(l)} + \sigma_n^2 I_l$ is obtained by using a matrix additive method, which shall not be described any further.

It can be seen from the above embodiment that 50 elements forming the Hermitian matrixes of the effective channel are calculated by calculating a product of the channel row vectors and the basic column vectors, and then the Hermitian matrixes of the effective channel are obtained by using the 50 elements, thereby lowering the calculation complexity, further lowering the power consumption of the equipment, and reducing the circuit size needed in performing corresponding processing.

Figure 4:
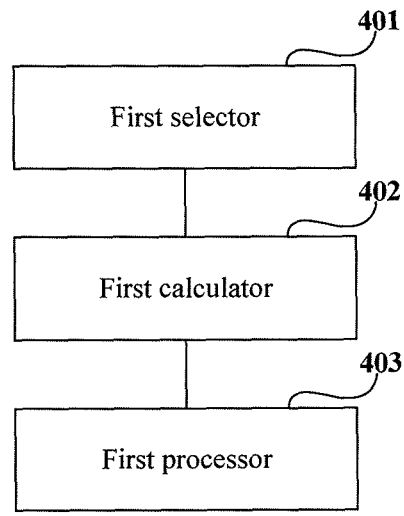
FIG. 4 is a schematic diagram showing the structure of an apparatus for determining an effective channel in accordance with the third embodiment of the present invention.

FIG. 4 is a schematic diagram showing the structure of an apparatus for determining an effective channel in accordance with the third embodiment of the present invention. As shown in FIG. 4, the apparatus comprises: a first selector 401, a first calculator 402 and a first processor 403;

wherein the first selector 401 is used for selecting more than one basic column vectors for determining a precoding matrix; in this embodiment, the basic column vectors selected by the first selector 401 are as shown in Tables 2 and 4, the determined parent codebooks are as shown in Tables 3 and 5, and corresponding precoding matrixes may be obtained from Table 1; and the manner of selecting the basic column vectors by the first selector 401 is similar to step 201 of the first embodiment, which shall not be described any further;

the first calculator 402 is used for calculating products of channel row vectors and the basic column vectors; in this embodiment, similar to step 202 of the first embodiment, the product of the channel row vector $\{H_i\}_{i=1}^4$ and the basis column vectors may be expressed as $H_i \phi_m$ (where, m=0~11) or $H_i \phi_m$ (where, m=0~7), and the basis column vectors $\phi_m$, $\phi_m$ are as shown in Tables 2 and 4. Therefore, the products $H_i \phi_m$ or $H_i \phi_m$ may be obtained easily, which is similar to step 202 of the first embodiment, and shall not be described any further; and the first processor 403 is used for determining the effective channel $HW_n^{(l)}$ by using the products calculated by the first calculator 402; in this embodiment, similar to step 203 of the first embodiment, the effective channel may be expressed as $HW_n^{(l)}$; where, the rank is l=1~4, and the codebook index is n=0~15; and the matrixes of the effective channel is expressed by formula (6); therefore, the effective channel $HW_n^{(l)}$ may be obtained only if $H_i G_n^{\{k_m\}}$ is obtained, and the product $H_i G_n^{\{k_m\}}$ may be determined according to the product $H_i \phi_m$ or $H_i \phi_m$ obtained by the first calculator 402.

It can be seen from the above embodiment that for a 4×4 MIMO system, the precoding matrix may be composed of 20 basic column vectors (as shown in Tables 2 and 4), hence, the effective channel matrix $HW_n^{(l)}$ is obtained by respectively calculating products of each channel vector $H_i$ and the 20 basic column vectors. Such a method is simple with a small amount of calculation, and lowers the complexity of the calculation, thereby lowering the power consumption of the equipment, and reducing the circuit size needed in performing corresponding processing. And the above method is not only applicable to a 4×4 MIMO system, but also applicable to a 2×2 or 8×8 MIMO system. The apparatus may be any UE needing to determine an effective channel.

In this embodiment, the precoding matrixes may be determined by directly using the basic column vectors, or by multiplying the basic column vectors by unit real numbers (1,-1) or unit imaginary numbers (j,-j).

In another embodiment, in order to lower the amount of calculation further, the inventors found in the implementation of the present invention that, in the products of the channel column vectors and the 20 basic column vectors (20 complex values), there exist some same computational parts in the composition of the 20 complex values, and the calculation complexity may be further lowered by calculating the same computational parts first, and then composing the 20 complex values by using the results of these same computational parts. It is found in observations that there are totally 24 same computational parts that may be used for a 4×4 MIMO system.

In these cases, when there exist same computational parts in the multiplication operation of a row element $\{H_i\}_{i=1}^4$ of the channel row vectors and the basic column vectors, the first calculator 402 comprises a second calculator and a third calculator; wherein the second calculator is used for calculating the same computational parts, and the third calculator is used for calculating the products of the channel row vectors and the basic column vectors by using the same computational parts.

For example, for a 4×4 MIMO system, similar to the first embodiment, the same computational parts are as shown in Table 6, and the products are as shown in Tables 7 and 8. Therefore, the apparatus may further lower the calculation amount and simplify the calculation, thereby further lowering the power consumption of the equipment, and reducing the circuit size needed in performing corresponding processing.

Figure 5:
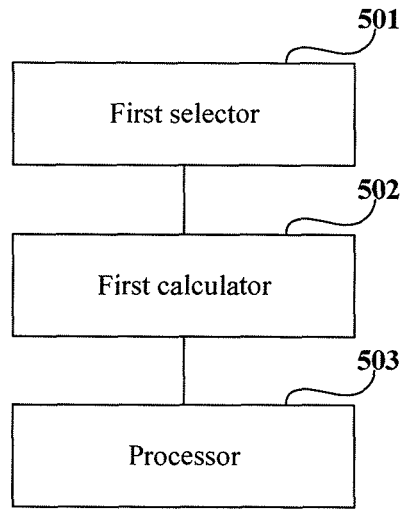
FIG. 5 is a schematic diagram showing the structure of an apparatus for determining a Hermitian matrix of an effective channel in accordance with the fourth embodiment of the present invention.

FIG. 5 is a schematic diagram showing the structure of an apparatus for determining a Hermitian matrix of an effective channel in accordance with the fourth embodiment of the present invention. As shown in FIG. 5, the apparatus comprises: a first selector 501, a first calculator 502 and a processor 503; wherein the functions of the first selector 501 and the first calculator 502 are similar to those of the first selector 401 and the first calculator 402 in the third embodiment, which shall not be described any further.

The processor 503 is used for obtaining a Hermitian matrix of an effective channel by using the products calculated by the first calculator 502; in this embodiment, similar to the second embodiment, the Hermitian matrix of the effective channel may be expressed as $(HW_n^{(l)})^H HW_n^{(l)}$, as expressed in formula (8), or may be expressed as $(HW_n^{(l)})^H HW_n^{(l)}$. Therefore, the Hermitian matrix $(HW_n^{(l)})^H HW_n^{(l)}$ of the effective channel may be obtained only if $H_i G_n^{\{k_m\}}$ is obtained, the matrix $(HW_n^{(l)})^H HW_n^{(l)} + \sigma_n^2 I_l$ may also be obtained, and the product $H_i G_n^{\{k_m\}}$ may be determined according to the product $H_i \phi_m$ or $H_i \phi_m$ obtained by the first calculator 502.

In another embodiment, in order to further simplify the calculation, the inventors observed the Hermitian matrix of the effective channel carefully and found that the Hermitian matrix of the effective channel is composed of several elements. Therefore, all the elements of the Hermitian matrixes of the effective channel may be obtained by calculating the several elements.

For example, the processor 503 may calculate the elements composing the Hermitian matrix of the effective channel in advance, and then determine the Hermitian matrix of the effective channel by using the calculated elements.

For example, for a 4×4 MIMO system, total 16×4=64 Hermitian matrixes of the effective channel are composed of 50 elements. Therefore, all the elements of the Hermitian matrixes of the effective channel are obtained by calculating the 50 elements.

The values of the 50 elements are shown in Tables 9 and 10, and the Hermitian matrixes $(HW_n^{(l)})^H HW_n^{(l)}$ or $(HW_n^{(l)})^H HW_n^{(l)} + \sigma_n^2 I_l$ of the effective channel that are obtained by using the values shown in Tables 9 and 10 are shown in Table 11. With the processing above, the calculation may be simplified, thereby further lowering the power consumption of the equipment, and reducing the circuit size needed in performing corresponding processing.

An embodiment of the present invention further provides an apparatus, which is a combination of the apparatuses of the third embodiment and the fourth embodiment; furthermore, such an apparatus may share the first selector and the first calculator, and the first processor 403 and the processor 503 may also be realized by using the same processor.

Figure 6:
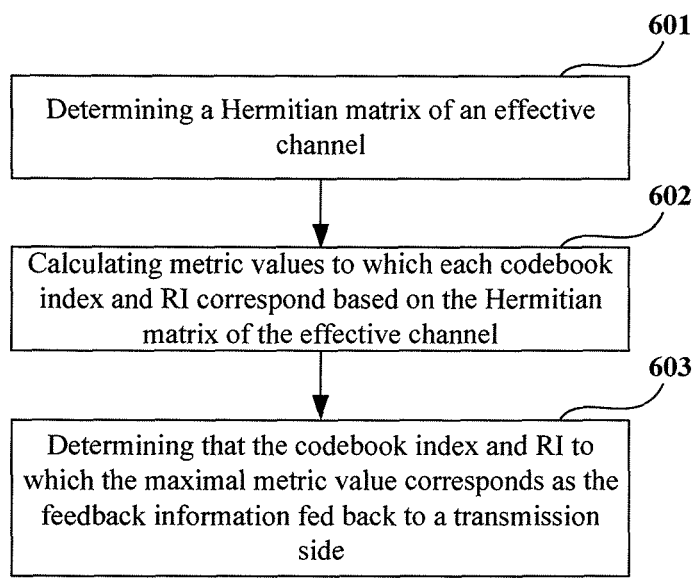
FIG. 6 is a flowchart of a method for determining feedback information in accordance with the fifth embodiment of the present invention.

FIG. 6 is a flowchart of a method for determining feedback information in accordance with the fifth embodiment of the present invention. As shown in FIG. 6, the method comprises:

Step 601: determining a Hermitian matrix of an effective channel;

in this embodiment, the effective Hermitian matrix is $(HW_n^{(l)})^H HW_n^{(l)} + \sigma_n^2 I_l$, and the Hermitian matrix of the effective channel may be determined by using the method of the second embodiment, which shall not be described any further;

in addition, the Hermitian matrix of the effective channel may also be determined by using any one of existing methods;

for example, the Hermitian matrixes $(HW_n^{(l)})^H HW_n^{(l)}$ of the effective channel are as shown in Table 11. Therefore, the Hermitian matrixes $(HW_n^{(l)})^H HW_n^{(l)} + \sigma_n^2 I_l$ of the effective channel are obtained by using the matrixes shown in Table 11, which shall not be described any further;

Step 602: calculating metric values to which each codebook index and RI correspond based on the Hermitian matrix of the effective channel;

in this embodiment, the metric values may be an SINR (formula (3)), or a capacity (formula (4)), etc.; wherein, whichever the metric value is used, an inversion matrix of the Hermitian matrix of the effective channel needs to be obtained, and then the metric values to which each RI and codebook index (that is, PMI) correspond are calculated by using the inversion matrix;

as shown in formulae (3) and (4), an inversion matrix $A_n^{(l)}$ of the Hermitian matrix of the effective channel needs to be calculated as shown in formula (9), and then the metric values to which each PMI and RI correspond are calculated by using the inversion matrix;

$$A_n^{(l)} = [(HW_n^{(l)})^H HW_n^{(l)} + \sigma_n^2 I_l]^{-1} \quad (9)$$

for example, for a 4×4 MIMO system, the rank=1~4, the codebook index=0~15. The determination of the inversion matrixes when the rank is 1, 2, 3 and 4, is described below:

when the rank=1, the Hermitian matrixes $(HW_n^{(l)})^H HW_n^{(l)}$ of the effective channel may be directly used to calculate the inversion matrix $A_n^{(l)}$; for example, when the Hermitian matrixes of the effective channel are calculated by using the method of the second embodiment of the present invention, in step 602, the Hermitian matrixes of the effective channel shown in Table 11 may be used to directly calculate the inversion matrix $A_n^{(l)}$, as shown in Table 12:

TABLE 12

| Codebook indices $n$ | $A_n^{(l)}$ (rank = 1) | Codebook indices $n$ | $A_n^{(l)}$ |
|---|---|---|---|
| 0 | $\frac{1}{\alpha_0 + \sigma_n^2}$ | 8 | $\frac{1}{\alpha_4 + \sigma_n^2}$ |
| 1 | $\frac{1}{\alpha_{10} + \sigma_n^2}$ | 9 | $\frac{1}{\alpha_{14} + \sigma_n^2}$ |
| 2 | $\frac{1}{\alpha_7 + \sigma_n^2}$ | 10 | $\frac{1}{\alpha_9 + \sigma_n^2}$ |
| 3 | $\frac{1}{\alpha_{17} + \sigma_n^2}$ | 11 | $\frac{1}{\alpha_{19} + \sigma_n^2}$ |
| 4 | $\frac{1}{\beta_0 + \sigma_n^2}$ | 12 | $\frac{1}{\alpha_{20} + \sigma_n^2}$ |
| 5 | $\frac{1}{\beta_{10} + \sigma_n^2}$ | 13 | $\frac{1}{\alpha_{24} + \sigma_n^2}$ |
| 6 | $\frac{1}{\beta_7 + \sigma_n^2}$ | 14 | $\frac{1}{\alpha_{27} + \sigma_n^2}$ |
| 7 | $\frac{1}{\beta_{17} + \sigma_n^2}$ | 15 | $\frac{1}{\alpha_{29} + \sigma_n^2}$ | when the rank=2, the Hermitian matrixes of the effective channel shown in Table 11 may be directly used in calculation, and the calculation results are shown in Table 13:

TABLE 13

| Codebook indices n | $[A_n^{(2)}]_{(1,1)}$ (rank = 2) | $[A_n^{(2)}]_{(2,2)}$ |
|---|---|---|
| 0 | $\frac{\alpha_9}{\alpha_0 \alpha_9 - |\alpha_3|^2}$ | $\frac{\alpha_0}{\alpha_0 \alpha_9 - |\alpha_3|^2}$ |
| 1 | $\frac{\alpha_{14}}{\alpha_{10}\alpha_{14} - |\alpha_{11}|^2}$ | $\frac{\alpha_{10}}{\alpha_{10}\alpha_{14} - |\alpha_{11}|^2}$ |
| 2 | $\frac{\alpha_9}{\alpha_7 \alpha_9 - |\alpha_8|^2}$ | $\frac{\alpha_7}{\alpha_7 \alpha_9 - |\alpha_8|^2}$ |
| 3 | $\frac{\alpha_{19}}{\alpha_{17}\alpha_{19} - |\alpha_{18}|^2}$ | $\frac{\alpha_{17}}{\alpha_{17}\alpha_{19} - |\alpha_{18}|^2}$ |
| 4 | $\frac{\beta_9}{\beta_0 \beta_9 - |\beta_3|^2}$ | $\frac{\beta_0}{\beta_0 \beta_9 - |\beta_3|^2}$ |
| 5 | $\frac{\beta_{19}}{\beta_{10}\beta_{19} - |\beta_{13}|^2}$ | $\frac{\beta_{10}}{\beta_{10}\beta_{19} - |\beta_{13}|^2}$ |
| 6 | $\frac{\beta_0}{\beta_0 \beta_7 - |\beta_2|^2}$ | $\frac{\beta_7}{\beta_0 \beta_7 - |\beta_2|^2}$ |
| 7 | $\frac{\beta_{10}}{\beta_{10}\beta_{17} - |\beta_{12}|^2}$ | $\frac{\beta_{17}}{\beta_{10}\beta_{17} - |\beta_{12}|^2}$ |
| 8 | $\frac{\alpha_0}{\alpha_0 \alpha_4 - |\alpha_1|^2}$ | $\frac{\alpha_4}{\alpha_0 \alpha_4 - |\alpha_1|^2}$ |
| 9 | $\frac{\alpha_{17}}{\alpha_{14}\alpha_{17} - |\alpha_{15}|^2}$ | $\frac{\alpha_{14}}{\alpha_{14}\alpha_{17} - |\alpha_{15}|^2}$ |
| 10 | $\frac{\alpha_4}{\alpha_4 \alpha_9 - |\alpha_6|^2}$ | $\frac{\alpha_9}{\alpha_4 \alpha_9 - |\alpha_6|^2}$ |

TABLE 13-continued (rank = 2)

Figure 7:
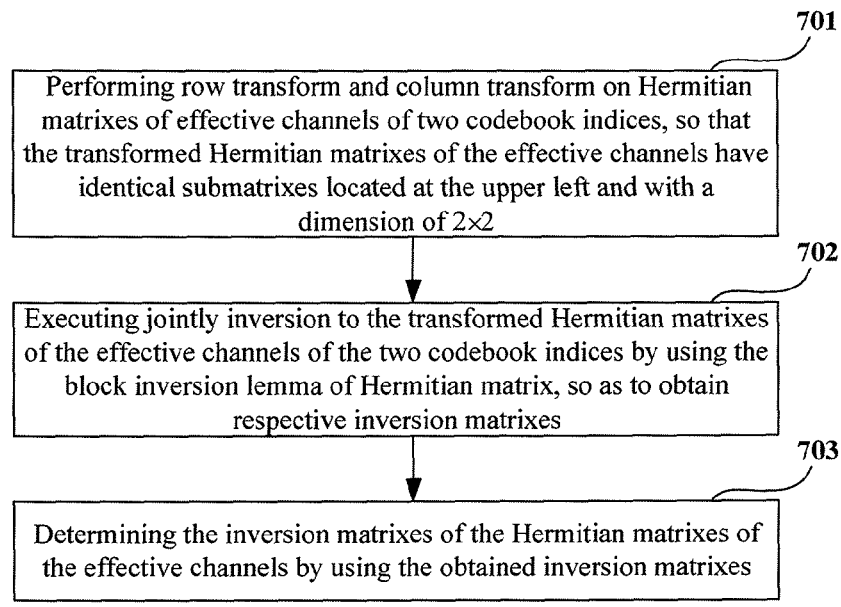
FIG. 7 is a flowchart of a method for calculating an inversion matrix when a rank is equal to 3 in accordance with the fifth embodiment of the present invention.

| Codebook indices n | $[A_n^{(2)}]_{(1,1)}$ | $[A_n^{(2)}]_{(2,2)}$ |
|---|---|---|
| 11 | $\dfrac{\alpha_{14}}{\alpha_{14}\alpha_{19} - |\alpha_{16}|^2}$ | $\dfrac{\alpha_{19}}{\alpha_{14}\alpha_{19} - |\alpha_{16}|^2}$ |
| 12 | $\dfrac{\alpha_{24}}{\alpha_{20}\alpha_{24} - |\alpha_{21}|^2}$ | $\dfrac{\alpha_{20}}{\alpha_{20}\alpha_{24} - |\alpha_{21}|^2}$ |
| 13 | $\dfrac{\alpha_{29}}{\alpha_{24}\alpha_{29} - |\alpha_{26}|^2}$ | $\dfrac{\alpha_{24}}{\alpha_{24}\alpha_{29} - |\alpha_{26}|^2}$ |
| 14 | $\dfrac{\alpha_{20}}{\alpha_{20}\alpha_{27} - |\alpha_{22}|^2}$ | $\dfrac{\alpha_{27}}{\alpha_{20}\alpha_{27} - |\alpha_{22}|^2}$ |
| 15 | $\dfrac{\alpha_{27}}{\alpha_{27}\alpha_{29} - |\alpha_{28}|^2}$ | $\dfrac{\alpha_{29}}{\alpha_{27}\alpha_{29} - |\alpha_{28}|^2}$ | when the rank=3, the Hermitian matrixes of the effective channel shown in Table 11 may be used to directly calculate the inversion matrix $A_n^{(l)}$; however, in order to further simplify the calculation and lower the complexity of calculation, the method shown in FIG. 7 may also be used to calculate the inversion matrix $A_n^{(l)}$ which will be introduced later;

when the rank=4, the Hermitian matrixes of the effective channel shown in Table 11 may be used to directly calculate the inversion matrix $A_n^{(l)}$; however, in order to further simplify the calculation and lower the complexity of calculation, the method shown in FIG. 8 may also be used to calculate the inversion matrix $A_n^{(l)}$ which will be introduced later;

in this embodiment, after the inversion matrix $A_n^{(l)}$ is calculated by using the method described above, diagonal elements in the inversion matrix $A_n^{(l)}$ may be used to further calculate the metric values shown in formulae (3) and (4);

Step 603: determining that the codebook index (i.e. the PMI) and RI to which the maximal metric value corresponds as the feedback information fed back to a transmission side; wherein this step is similar to that of the prior art, which shall not describe any further.

FIG. 7 is a flowchart of a method for calculating an inversion matrix when a rank is equal to 3 in accordance with the fifth embodiment of the present invention. As shown in FIG. 7, in calculating an inversion matrix, it comprises:

Step 701: performing row transform and column transform on Hermitian matrixes of effective channels of two codebook indices, so that the transformed Hermitian matrixes of the effective channels have identical submatrixes located at the upper left and with a dimension of 2×2;

in this embodiment, the two codebook indices may be selected as following:

predefining two subsets of codebook indices; wherein the selected two codebook indices belong to the same codebook index subset, and two elements in diagonal elements of the Hermitian matrixes of one of the codebook indices belong to the same set as two elements in diagonal elements of the Hermitian matrixes of the other one of the codebook indices (the set contains only two elements); and the two subsets of codebook indices are $\Phi_1$:{0,1,2,3,8,9,10,11,12,13,14,15}, $\Phi_2$:{4,5,6,7}, and the two codebook indices may be (0,8), (2,10), (9,11), (12,13), (14,15), (1,3), (4,6), (5,7), respectively; however, they are not limited to the above pairs of codebook indices, and other pairs of codebook indices may be selected in accordance with the above rule, such as (0,10), (1,9), (2,8), (3,11), (4,6), (5, 7), (12, 15), (13, 14), etc.;

Step 702: executing jointly inversion to the transformed Hermitian matrixes of the effective channels of the two codebook indices by using the block inversion lemma of Hermitian matrix, so as to obtain respective inversion matrixes;

wherein the so-called jointly inversion refers to that two or more matrixes to be inverted satisfy certain commonality, and such commonality enables these matrixes to have some same computational parts in inversion procedure, with which jointly inversion may be achieved, thereby lowering the complexity of calculating inversion matrixes;

Step 703: determining the inversion matrixes of the Hermitian matrixes of the effective channels by using the obtained inversion matrixes;

in this embodiment, for any two codebook indices (X, Y), where, the values of X and Y are between 0 and 15, the inversion matrixes of the Hermitian matrixes of the effective channels may be calculated according to the method shown in FIG. 7 which is described below in detail:

1) using the Hermitian matrix of the effective channel shown in Table 11 with a rank of 3 and respective codebook indices of (X, Y) to obtain the Hermitian matrix $(HW_n^{(l)})^H HW_n^{(l)} + \sigma_n^2 I_l$ of the effective channel, and performing row transform and column transform on the Hermitian matrix $(HW_n^{(l)})^H HW_n^{(l)} + \sigma_n^2 I_l$, so as to obtain two basic Hermitian matrixes, which are expressed as $$P_X = \begin{bmatrix} S & r_X \\ r_X^H & q_X \end{bmatrix},$$

$$P_Y = \begin{bmatrix} S & r_Y \\ r_Y^H & q_Y \end{bmatrix},$$

where S is a 2×2 submatrix, corresponding to step 701;

2) calculating an inversion matrix $S^{-1}$ of S;

3) calculating inversion matrixes of the two basic Hermitian matrixes according to the obtained inversion matrix $S^{-1}$ of S and $r_X$, $r_Y$, $q_x$, $q_y$ in the basic Hermitian matrixes $P_X$ and $P_Y$, the inversion matrixes being expressed as and $P_X^{-1}$ and $P_Y^{-1}$; wherein 2) and 3) correspond to step 702;

4) calculating the variable according to a relationship between the obtained $P_X^{-1}$, $P_Y^{-1}$ and $A_X^{(3)}$, $A_Y^{(3)}$, which corresponds to step 703.

Following description is given taking particular codebook indices as examples.

Example 1: when the two codebook indices are (0, 8):

1) using the Hermitian matrix shown in Table 11 with a rank of 3 and codebook indices of (0, 8) to obtain $(HW_n^{(l)})^H HW_n^{(l)} + \sigma_n^2 I_l$, and performing row transform and column transform on the matrix $(HW_n^{(l)})^H HW_n^{(l)} + \sigma_n^2 I_l$, the transformed Hermitian matrixes being expressed as $$P_0 = \begin{bmatrix} S & r_0 \\ r_0^H & q_0 \end{bmatrix}, P_8 = \begin{bmatrix} S & r_8 \\ r_8^H & q_8 \end{bmatrix},$$

wherein a 2×2 submatrix is S, and other elements in the matrix are as shown in Table 14;

TABLE 14

| RI = 3 (0, 8) |
| --- |
| $S = \begin{bmatrix} \alpha_0 + 3\sigma_n^2 & \alpha_1 \\ \alpha_1^* & \alpha_4 + 3\sigma_n^2 \end{bmatrix}$    $\begin{aligned} r_0 &= [\alpha_3 \quad \alpha_6]^T \\ r_8 &= [\alpha_2 \quad \alpha_5]^T \end{aligned}$    $\begin{aligned} q_0 &= \alpha_9 + 3\sigma_n^2 \\ q_8 &= \alpha_7 + 3\sigma_n^2 \end{aligned}$ |

2) calculating an inversion matrix $S^{-1}$ of the matrix S, by using the formula below:

$$S^{-1} = \frac{1}{|S|}\begin{bmatrix} \alpha_4 + 3\sigma_n^2 & -\alpha_1 \\ -\alpha_1^* & \alpha_0 + 3\sigma_n^2 \end{bmatrix} \quad (10)$$

$$\text{where, } |S| = (\alpha_0 + 3\sigma_n^2)(\alpha_4 + 3\sigma_n^2) - |\alpha_1|^2 \quad (11)$$

3) using $S^{-1}$ to calculate $\{[P_n^{-1}]_{(i,j)}\}_{i,j=1;i\leq j}^3$ (n=0,8), where $[P_n^{-1}]_{(i,j)}$ denotes the element in the ith row and the jth column ($1\leq i\leq j\leq 3$) of $P_n^{-1}$; as $P_n^{-1}$ is a Hermitian matrix, the whole matrix may be obtained by calculating its upper triangle elements only, the calculation formulae being as shown in Table 15:

TABLE 15

| | | |
| --- | --- | --- |
| $[P_n^{-1}]_{(1,1)} = [S^{-1}]_{(1,1)} + \frac{1}{u_n}|v_{n(1)}|^2$ | $[P_n^{-1}]_{(1,2)} = [S^{-1}]_{(1,2)} + \frac{1}{u_n}(v_{n(1)}v_{n(2)}^*)$ | $[P_n^{-1}]_{(1,3)} = \frac{1}{u_n}(v_{n(1)})$ |
| $[P_n^{-1}]_{(2,2)} = [S^{-1}]_{(2,2)} + \frac{1}{u_n}|v_{n(2)}|^2$ | $[P_n^{-1}]_{(2,3)} = \frac{1}{u_n}(v_{n(2)})$ | $[P_n^{-1}]_{(3,3)} = \frac{1}{u_n}$ | where, $v_n = -S^{-1}r_n$, $u_n = q_n + r_n^H v_n$, and $v_{n(i)}$ denotes the ith element of vector $v_n$; wherein n is a codebook index, which is 0 and 8 in this example, respectively;

4) after $P_n^{-1}$ is obtained, $P_n^{-1}$ may be used to calculate the inversion matrix $A_n^{(l)}$ shown in formula (9), where n=0,8. Tables 16 and 17 show a relational expressions of $P_n^{-1}$ and $A_n^{(3)}$, respectively, and in calculating the metric values, only the diagonal elements, i.e. $\{[A_n^{(l)}]_{(1,1)}, [A_n^{(l)}]_{(2,2)}, [A_n^{(l)}]_{(3,3)},\}$, are needed, where, n=0,8.

TABLE 16

| n = 0 |
| --- |
| $[A_0^{(3)}]_{(1,1)} = 3[P_0^{-1}]_{(1,1)}$   $[A_0^{(3)}]_{(1,2)} = 3[P_0^{-1}]_{(1,2)}$   $[A_0^{(3)}]_{(1,3)} = 3[P_0^{-1}]_{(1,3)}$ |
| $[A_0^{(3)}]_{(2,2)} = 3[P_0^{-1}]_{(2,2)}$   $[A_0^{(3)}]_{(2,3)} = 3[P_0^{-1}]_{(2,3)}$   $[A_0^{(3)}]_{(3,3)} = 3[P_0^{-1}]_{(3,3)}$ |

TABLE 17

| n = 8 |
| --- |
| $[A_8^{(3)}]_{(1,1)} = 3[P_8^{-1}]_{(2,2)}$   $[A_8^{(3)}]_{(1,2)} = 3([P_8^{-1}]_{(1,2)})^*$   $[A_8^{(3)}]_{(1,3)} = -3[P_8^{-1}]_{(2,3)}$ |
| $[A_8^{(3)}]_{(2,2)} = 3[P_8^{-1}]_{(1,1)}$   $[A_8^{(3)}]_{(2,3)} = -3[P_8^{-1}]_{(1,3)}$   $[A_8^{(3)}]_{(3,3)} = 3[P_8^{-1}]_{(3,3)}$ |

Example 2: when the codebook indices are (2, 10), the calculation procedure is similar to Example 1:

1) using the Hermitian matrix shown in Table 11 with a rank of 3 and codebook indices of (2, 10) to obtain $(HW_n^{(l)})^H HW_n^{(l)} + \sigma_n^2 I_l$, and performing row transform and column transform on the matrix $(HW_n^{(l)})^H HW_n^{(l)} + \sigma_n^2 I_l$, the transformed Hermitian matrixes being expressed as $$P_2 = \begin{bmatrix} S & r_2 \\ r_2^H & q_2 \end{bmatrix}, P_{10} = \begin{bmatrix} S & r_{10} \\ r_{10}^H & q_{10} \end{bmatrix},$$

wherein a 2×2 submatrix is S, and other elements in the matrix are as shown in Table 18.

TABLE 18

| RI = 3 (2, 10) |
| --- |
| $S = \begin{bmatrix} \alpha_7 + 3\sigma_n^2 & \alpha_8 \\ \alpha_8^* & \alpha_9 + 3\sigma_n^2 \end{bmatrix}$    $\begin{aligned} r_2 &= [\alpha_2^* \quad \alpha_3^*]^T \\ r_{10} &= [\alpha_5^* \quad \alpha_6^*]^T \end{aligned}$    $\begin{aligned} q_2 &= \alpha_0 + 3\sigma_n^2 \\ q_{10} &= \alpha_4 + 3\sigma_n^2 \end{aligned}$ |

2) calculating an inversion matrix $S^{-1}$ of the matrix S, in a method similar to the above, such as formula (10);

3) using $S^{-1}$ to calculate $P_n^{-1}$, in a method similar to the above, such as formula (15), which shall not be described any further;

4) after $P_n^{-1}$ is obtained, may be used to calculate the inversion matrix $A_n^{(3)}$ shown in formula (9), where n=2,10. Tables 19 and 20 show relational expressions of $P_n^{-1}$ and $A_n^{(3)}$, respectively, and in calculating the metric values, only the diagonal elements, i.e. $\{[A_n^{(3)}]_{(1,1)}, [A_n^{(3)}]_{(2,2)}, [A_n^{(3)}]_{(3,3)}\}$, are needed, where, n=2, 10;

TABLE 19

| n = 2 |
| --- |
| $[A_2^{(3)}]_{(1,1)} = 3[P_2^{-1}]_{(1,1)}$   $[A_2^{(3)}]_{(1,2)} = -3[P_2^{-1}]_{(1,2)}$   $[A_2^{(3)}]_{(1,3)} = 3[P_2^{-1}]_{(1,3)}$ |
| $[A_2^{(3)}]_{(2,2)} = 3[P_2^{-1}]_{(2,2)}$   $[A_2^{(3)}]_{(2,3)} = -3[P_2^{-1}]_{(2,3)}$   $[A_2^{(3)}]_{(3,3)} = 3[P_2^{-1}]_{(3,3)}$ |

TABLE 20

| n = 10 |
| --- |
| $[A_{10}^{(3)}]_{(1,1)} = 3[P_{10}^{-1}]_{(2,2)}$   $[A_{10}^{(3)}]_{(1,2)} = -3([P_{10}^{-1}]_{(1,2)})^*$   $[A_{10}^{(3)}]_{(1,3)} = -3[P_{10}^{-1}]_{(2,3)}$ |
| $[A_{10}^{(3)}]_{(2,2)} = 3[P_{10}^{-1}]_{(1,1)}$   $[A_{10}^{(3)}]_{(2,3)} = 3[P_{10}^{-1}]_{(1,3)}$   $[A_{10}^{(3)}]_{(3,3)} = 3[P_{10}^{-1}]_{(3,3)}$ |

Example 3: when the codebook indices are (9, 11), the calculation procedure is similar to Example 1:

1) using the Hermitian matrix shown in Table 11 with a rank of 3 and codebook indices of (9, 11) to obtain $(HW_n^{(l)})^H HW_n^{(l)} + \sigma_n^2 I_l$, and performing row transform and column transform on the matrix $(HW_n^{(l)})^H HW_n^{(l)} + \sigma_n^2 I_l$, the transformed Hermitian matrixes being expressed as $$P_9 = \begin{bmatrix} S & r_9 \\ r_9^H & q_9 \end{bmatrix}, P_{11} = \begin{bmatrix} S & r_{11} \\ r_{11}^H & q_{11} \end{bmatrix},$$

wherein a 2×2 submatrix is S, and other elements in the matrix are as shown in Table 21;

TABLE 21

| RI = 3 (9, 11) |
| --- |
| $S = \begin{bmatrix} \alpha_{14} + 3\sigma_n^2 & \alpha_{16} \\ \alpha_{16}^* & \alpha_{19} + 3\sigma_n^2 \end{bmatrix}$  $\begin{matrix} r_9 = [\alpha_{15} \quad \alpha_{18}^*]^T \\ r_{11} = [\alpha_{11}^* \quad \alpha_{13}^*]^T \end{matrix}$  $\begin{matrix} q_9 = \alpha_{17} + 3\sigma_n^2 \\ q_{11} = \alpha_{10} + 3\sigma_n^2 \end{matrix}$ |

2) calculating an inversion matrix $S^{-1}$ of the matrix S, in a method similar to the above, such as formula (10);

3) using $S^{-1}$ to calculate $P_n^{-1}$, in a method similar to the above, such as formula (15), which shall not be described any further;

4) after $P_n^{-1}$ is obtained, $P_n^{-1}$ may be used to calculate the inversion matrix $A_n^{(3)}$ shown in formula (9), where n=9,11. Tables 22-1 and 22-2 show relational expressions of $P_n^{-1}$ and $A_n^{(3)}$, respectively, and in calculating the metric values, only the diagonal elements, i.e. $\{[A_n^{(3)}]_{(1,1)}, [A_n^{(3)}]_{(2,2)}, [A_n^{(3)}]_{(3,3)}\}$, are needed, where, n=9, 11;

TABLE 22-1

| n = 9 |
| --- |
| $[A_9^{(3)}]_{(1,1)} = 3[P_9^{-1}]_{(1,1)}$  $[A_9^{(3)}]_{(1,2)} = -3[P_9^{-1}]_{(1,2)}$  $[A_9^{(3)}]_{(1,3)} = 3[P_9^{-1}]_{(1,3)}$ |
| $[A_9^{(3)}]_{(2,2)} = 3[P_9^{-1}]_{(2,2)}$  $[A_9^{(3)}]_{(2,3)} = -3[P_9^{-1}]_{(2,3)}$  $[A_9^{(3)}]_{(3,3)} = 3[P_9^{-1}]_{(3,3)}$ |

TABLE 22-2

| n = 11 |
| --- |
| $[A_{11}^{(3)}]_{(1,1)} = 3[P_{11}^{-1}]_{(2,2)}$  $[A_{11}^{(3)}]_{(1,2)} = -3([P_{11}^{-1}]_{(1,2)})^*$  $[A_{11}^{(3)}]_{(1,3)} = -3[P_{11}^{-1}]_{(2,3)}$ |
| $[A_{11}^{(3)}]_{(2,2)} = 3[P_{11}^{-1}]_{(1,1)}$  $[A_{11}^{(3)}]_{(2,3)} = 3[P_{11}^{-1}]_{(1,3)}$  $[A_{11}^{(3)}]_{(3,3)} = 3[P_{11}^{-1}]_{(3,3)}$ |

Example 4: when the codebook indices are (12, 13), the calculation procedure is similar to Example 1:

1) using the Hermitian matrix shown in Table 11 with a rank of 3 and codebook indices of (12, 13) to obtain $(HW_n^{(l)})^H HW_n^{(l)} + \sigma_n^2 I_l$, and performing row transform and column transform on $(HW_n^{(l)})^H HW_n^{(l)} + \sigma_n^2 I_l$, the transformed Hermitian matrixes being expressed as $$P_{12} = \begin{bmatrix} S & r_{12} \\ r_{12}^H & q_{12} \end{bmatrix}, P_{13} = \begin{bmatrix} S & r_{13} \\ r_{13}^H & q_{13} \end{bmatrix},$$

wherein a 2×2 submatrix is S, and other elements in the matrix are as shown in Table 23;

TABLE 23

| RI = 3 (12, 13) |
| --- |
| $S = \begin{bmatrix} \alpha_{20} + 3\sigma_n^2 & \alpha_{21} \\ \alpha_{21}^* & \alpha_{24} + 3\sigma_n^2 \end{bmatrix}$  $\begin{matrix} r_{12} = [\alpha_{22} \quad \alpha_{25}]^T \\ r_{13} = [\alpha_{23} \quad \alpha_{26}]^T \end{matrix}$  $\begin{matrix} q_{12} = \alpha_{27} + 3\sigma_n^2 \\ q_{13} = \alpha_{29} + 3\sigma_n^2 \end{matrix}$ |

2) calculating an inversion matrix $S^{-1}$ of the matrix S, in a method similar to the above, such as formula (10);

3) using $S^{-1}$ to calculate $P_n^{-1}$, in a method similar to the above, such as formula (15), which shall not be described any further.

4) after $P_n^{-1}$ is obtained, $P_n^{-1}$ may be used to calculate the inversion matrix $A_n^{(3)}$ shown in formula (9), where n=12,13; Tables 24 and 25 show relational expressions of $P_n^{-1}$ and $A_n^{(3)}$, respectively, and in calculating the metric values, only the diagonal elements, i.e. $\{[A_n^{(3)}]_{(1,1)}, [A_n^{(3)}]_{(2,2)}, [A_n^{(3)}]_{(3,3)}\}$, are needed, where, n=12, 13;

TABLE 24

| n = 12 |
| --- |
| $[A_{12}^{(3)}]_{(1,1)} = 3[P_{12}^{-1}]_{(1,1)}$  $[A_{12}^{(3)}]_{(1,2)} = 3[P_{12}^{-1}]_{(1,2)}$  $[A_{12}^{(3)}]_{(1,3)} = 3[P_{12}^{-1}]_{(1,3)}$ |
| $[A_{12}^{(3)}]_{(2,2)} = 3[P_{12}^{-1}]_{(2,2)}$  $[A_{12}^{(3)}]_{(2,3)} = 3[P_{12}^{-1}]_{(2,3)}$  $[A_{12}^{(3)}]_{(3,3)} = 3[P_{12}^{-1}]_{(3,3)}$ |

TABLE 25

| n = 13 |
| --- |
| $[A_{13}^{(3)}]_{(1,1)} = 3[P_{13}^{-1}]_{(2,2)}$  $[A_{13}^{(3)}]_{(1,2)} = 3([P_{13}^{-1}]_{(1,2)})^*$  $[A_{13}^{(3)}]_{(1,3)} = 3[P_{13}^{-1}]_{(2,3)}$ |
| $[A_{13}^{(3)}]_{(2,2)} = 3[P_{13}^{-1}]_{(1,1)}$  $[A_{13}^{(3)}]_{(2,3)} = 3[P_{13}^{-1}]_{(1,3)}$  $[A_{13}^{(3)}]_{(3,3)} = 3[P_{13}^{-1}]_{(3,3)}$ |

Example 5: when the codebook indices are (14, 15), the calculation procedure is similar to Example 1:

1) using the Hermitian matrix shown in Table 11 with a rank of 3 and codebook indices of (14, 15) to obtain $(HW_n^{(l)})^H HW_n^{(l)} + \sigma_n^2 I_l$, and performing row transform and column transform on the matrix $(HW_n^{(l)})^H HW_n^{(l)} + \sigma_n^2 I_l$, the transformed Hermitian matrixes being expressed as $$P_{14} = \begin{bmatrix} S & r_{14} \\ r_{14}^H & q_{14} \end{bmatrix}, P_{15} = \begin{bmatrix} S & r_{15} \\ r_{15}^H & q_{15} \end{bmatrix},$$

wherein a 2×2 submatrix is S, and other elements in the matrix are as shown in Table 26;

TABLE 26

| RI = 3 (14, 15) |
| --- |
| $S = \begin{bmatrix} \alpha_{27} + 3\sigma_n^2 & \alpha_{28} \\ \alpha_{28}^* & \alpha_{29} + 3\sigma_n^2 \end{bmatrix}$  $\begin{matrix} r_{14} = [\alpha_{22}^* \quad \alpha_{23}^*]^T \\ r_{15} = [\alpha_{25}^* \quad \alpha_{26}^*]^T \end{matrix}$  $\begin{matrix} q_{14} = \alpha_{20} + 3\sigma_n^2 \\ q_{15} = \alpha_{24} + 3\sigma_n^2 \end{matrix}$ |

2) calculating an inversion matrix $S^{-1}$ of the matrix S, in a method similar to the above, such as formula (10);

3) using $S^{-1}$ to calculate $P_n^{-1}$, in a method similar to the above, such as formula (15), which shall not be described any further;

4) after $P_n^{-1}$ is obtained, $P_n^{-1}$ may be used to calculate the inversion matrix $A_n^{(3)}$ shown in formula (9), where n=14,15; Tables 27 and 28 show relational expressions of $P_n^{-1}$ and $A_n^{(3)}$, respectively, and in calculating the metric values, only the diagonal elements, i.e. $\{[A_n^{(3)}]_{(1,1)}, [A_n^{(3)}]_{(2,2)}, [A_n^{(3)}]_{(3,3)}\}$, are needed, where, n=14, 15;

TABLE 27

| n = 14 |
| --- |
| $[A_{14}^{(3)}]_{(1,1)} = 3[P_{14}^{-1}]_{(1,1)}$  $[A_{14}^{(3)}]_{(1,2)} = 3[P_{14}^{-1}]_{(1,2)}$  $[A_{14}^{(3)}]_{(1,3)} = 3[P_{14}^{-1}]_{(1,3)}$ |
| $[A_{14}^{(3)}]_{(2,2)} = 3[P_{14}^{-1}]_{(2,2)}$  $[A_{14}^{(3)}]_{(2,3)} = 3[P_{14}^{-1}]_{(2,3)}$  $[A_{14}^{(3)}]_{(3,3)} = 3[P_{14}^{-1}]_{(3,3)}$ |

TABLE 28

| n = 15 | | |
|---|---|---|
| $[A_{15}^{(3)}]_{(1,1)} = 3[P_{15}^{-1}]_{(2,2)}$ | $[A_{15}^{(3)}]_{(1,2)} = 3([P_{15}^{-1}]_{(1,2)})^*$ | $[A_{15}^{(3)}]_{(1,3)} = 3[P_{15}^{-1}]_{(2,3)}$ |
| $[A_{15}^{(3)}]_{(2,2)} = 3[P_{15}^{-1}]_{(1,1)}$ | $[A_{15}^{(3)}]_{(2,3)} = 3[P_{15}^{-1}]_{(1,3)}$ | $[A_{15}^{(3)}]_{(3,3)} = 3[P_{15}^{-1}]_{(3,3)}$ |

Example 6: when the codebook indices are (1, 3), the calculation procedure is similar to Example 1:

1) using the Hermitian matrix shown in Table 11 with a rank of 3 and codebook indices of (1, 3) to obtain $(HW_n^{(l)})^H HW_n^{(l)} + \sigma_n^2 I_l$, and performing row transform and column transform on the matrix $(HW_n^{(l)})^H HW_n^{(l)} + \sigma_n^2 I_l$, the transformed Hermitian matrixes being expressed as $$P_1 = \begin{bmatrix} S & r_1 \\ r_1^H & q_1 \end{bmatrix}, P_3 = \begin{bmatrix} S & r_3 \\ r_3^H & q_3 \end{bmatrix},$$

wherein a 2×2 submatrix is S, and other elements in the matrix are as shown in Table 29;

TABLE 29

| RI = 3 (1, 3) | | |
|---|---|---|
| $S = \begin{bmatrix} \alpha_{10} + 3\sigma_n^2 & \alpha_{12} \\ \alpha_{12}^* & \alpha_{17} + 3\sigma_n^2 \end{bmatrix}$ | $r_1 = [\alpha_{11} \ \alpha_{15}^*]^T$ $r_3 = [\alpha_{13} \ \alpha_{18}]^T$ | $q_1 = \alpha_{14} + 3\sigma_n^2$ $q_3 = \alpha_{19} + 3\sigma_n^2$ |

2) calculating an inversion matrix $S^{-1}$ of the matrix S, in a method similar to the above, such as formula (10);

3) using $S^{-1}$ to calculate $P_n^{-1}$, in a method similar to the above, such as formula (15), which shall not be described any further;

4) after $P_n^{-1}$ is obtained, may be used to calculate the inversion matrix $A_n^{(3)}$ shown in formula (9), where n=1,3; Tables 30 and 31 show relational expressions of $P_n^{-1}$ and $A_n^{(3)}$, respectively, and in calculating the metric values, only the diagonal elements, i.e. $\{[A_n^{(3)}]_{(1,1)}, [A_n^{(3)}]_{(2,2)}, [A_n^{(3)}]_{(3,3)}\}$, are needed, where, n=1, 3.

TABLE 30

| n = 1 | | |
|---|---|---|
| $[A_1^{(3)}]_{(1,1)} = 3[P_1^{-1}]_{(1,1)}$ | $[A_1^{(3)}]_{(1,2)} = 3[P_1^{-1}]_{(1,3)}$ | $[A_1^{(3)}]_{(1,3)} = 3[P_1^{-1}]_{(1,2)}$ |
| $[A_1^{(3)}]_{(2,2)} = 3[P_1^{-1}]_{(3,3)}$ | $[A_1^{(3)}]_{(2,3)} = 3([P_1^{-1}]_{(2,3)})^*$ | $[A_1^{(3)}]_{(3,3)} = 3[P_1^{-1}]_{(2,2)}$ |

TABLE 31

| n = 3 | | |
|---|---|---|
| $[A_3^{(3)}]_{(1,1)} = 3[P_3^{-1}]_{(2,2)}$ | $[A_3^{(3)}]_{(1,2)} = -3[P_3^{-1}]_{(2,3)}$ | $[A_3^{(3)}]_{(1,3)} = 3([P_3^{-1}]_{(1,2)})^*$ |
| $[A_3^{(3)}]_{(2,2)} = 3[P_3^{-1}]_{(3,3)}$ | $[A_3^{(3)}]_{(2,3)} = -3([P_3^{-1}]_{(1,3)})^*$ | $[A_3^{(3)}]_{(3,3)} = 3[P_3^{-1}]_{(1,1)}$ |

Example 7: when the codebook indices are (4, 6), the calculation procedure is similar to Example 1:

1) using the Hermitian matrix shown in Table 11 with a rank of 3 and codebook indices of (4, 6) to obtain $(HW_n^{(l)})^H HW_n^{(l)} + \sigma_n^2 I_l$, and performing row transform and column transform on the matrix $(HW_n^{(l)})^H HW_n^{(l)} + \sigma_n^2 I_l$, the transformed Hermitian matrixes being expressed as $$P_4 = \begin{bmatrix} S & r_4 \\ r_4^H & q_4 \end{bmatrix}, P_6 = \begin{bmatrix} S & r_6 \\ r_6^H & q_6 \end{bmatrix},$$

wherein a 2×2 submatrix is S, and other elements in the matrix are as shown in Table 32;

TABLE 32

| RI = 3 (4, 6) | | |
|---|---|---|
| $S = \begin{bmatrix} \beta_0 + 3\sigma_n^2 & \beta_1 \\ \beta_1^* & \beta_4 + 3\sigma_n^2 \end{bmatrix}$ | $r_4 = [\beta_3 \ \beta_6]^T$ $r_6 = [\beta_2 \ \beta_5]^T$ | $q_4 = \beta_9 + 3\sigma_n^2$ $q_6 = \beta_7 + 3\sigma_n^2$ |

2) calculating an inversion matrix $S^{-1}$ of the matrix S, in a method similar to the above, such as formula (10);

3) using $S^{-1}$ to calculate $P_n^{-1}$, in a method similar to the above, such as formula (15), which shall not be described any further;

4) after $P_n^{-1}$ is obtained, $P_n^{-1}$ may be used to calculate the inversion matrix $A_n^{(3)}$ shown in formula (9), where n=4,6; Tables 33 and 34 show relational expressions of $P_n^{-1}$ and $A_n^{(3)}$, respectively, and in calculating the metric values, only the diagonal elements, i.e. $\{[A_n^{(3)}]_{(1,1)}, [A_n^{(3)}]_{(2,2)}, [A_n^{(3)}]_{(3,3)}\}$, are needed, where, n=4, 6;

TABLE 33

| n = 4 | | | |
|---|---|---|---|
| $[A_4^{(3)}]_{(1,1)} = 3[P_4^{-1}]_{(1,1)}$ | $[A_4^{(3)}]_{(1,2)} = 3[P_4^{-1}]_{(1,2)}$ | $[A_4^{(3)}]_{(1,3)} = 3[P_4^{-1}]_{(1,3)}$ | |
| $[A_4^{(3)}]_{(2,2)} = 3[P_4^{-1}]_{(2,2)}$ | $[A_4^{(3)}]_{(2,3)} = 3[P_4^{-1}]_{(2,3)}$ | $[A_4^{(3)}]_{(3,3)} = 3[P_4^{-1}]_{(3,3)}$ | |

TABLE 34

| n = 6 | | |
|---|---|---|
| $[A_6^{(3)}]_{(1,1)} = 3[P_6^{-1}]_{(3,3)}$ | $[A_6^{(3)}]_{(1,2)} = -3([P_6^{-1}]_{(1,3)})^*$ | $[A_6^{(3)}]_{(1,3)} = 3([P_6^{-1}]_{(2,3)})^*$ |
| $[A_6^{(3)}]_{(2,2)} = 3[P_6^{-1}]_{(1,1)}$ | $[A_6^{(3)}]_{(2,3)} = -3[P_6^{-1}]_{(1,2)}$ | $[A_6^{(3)}]_{(3,3)} = 3[P_6^{-1}]_{(2,2)}$ |

Example 8: when the codebook indices are (5, 7), the calculation procedure is similar to Example 1:

1) using the Hermitian matrix shown in Table 11 with a rank of 3 and codebook indices of (5, 7) to obtain $(HW_n^{(l)})^H HW_n^{(l)} + \sigma_n^2 I_l$, and performing row transform and column transform on the matrix $(HW_n^{(l)})^H HW_n^{(l)} + \sigma_n^2 I_l$, the transformed Hermitian matrixes being expressed as $$P_5 = \begin{bmatrix} S & r_5 \\ r_5^H & q_5 \end{bmatrix}, P_7 = \begin{bmatrix} S & r_7 \\ r_7^H & q_7 \end{bmatrix},$$

wherein a 2×2 submatrix is S, and other elements in the matrix are as shown in Table 35;

TABLE 35

| RI = 3 (5, 7) | | |
|---|---|---|
| $S = \begin{bmatrix} \beta_{10} + 3\sigma_n^2 & \beta_{11} \\ \beta_{11}^* & \beta_{14} + 3\sigma_n^2 \end{bmatrix}$ | $r_5 = [\beta_{13} \ \beta_{16}]^T$ $r_7 = [\beta_{12} \ \beta_{15}]^T$ | $q_5 = \beta_{19} + 3\sigma_n^2$ $q_7 = \beta_{17} + 3\sigma_n^2$ |

2) calculating an inversion matrix $S^{-1}$ of the matrix S, in a method similar to the above, such as formula (10);

3) using $S^{-1}$ to calculate $P_n^{-1}$, in a method similar to the above, such as formula (15), which shall not be described any further;

4) after $P_n^{-1}$ is obtained, $P_n^{-1}$ may be used to calculate the inversion matrix $A_n^{(3)}$ shown in formula (9), where n=5,7. Tables 36 and 37 show relational expressions of $P_n^{-1}$ and $A_n^{(3)}$, respectively, and in calculating the metric values, only the diagonal elements, i.e. $\{[A_n^{(3)}]_{(1,1)}, [A_n^{(3)}]_{(2,2)}, [A_n^{(3)}]_{(3,3)}\}$, are needed, where, n=5, 7;

TABLE 36

| n = 5 |
| --- |
| $[A_5^{(3)}]_{(1,1)} = 3[P_5^{-1}]_{(1,1)}$ $[A_5^{(3)}]_{(1,2)} = 3[P_5^{-1}]_{(1,2)}$ $[A_5^{(3)}]_{(1,3)} = 3[P_5^{-1}]_{(1,3)}$ |
| $[A_5^{(3)}]_{(2,2)} = 3[P_5^{-1}]_{(2,2)}$ $[A_5^{(3)}]_{(2,3)} = 3[P_5^{-1}]_{(2,3)}$ $[A_5^{(3)}]_{(3,3)} = 3[P_5^{-1}]_{(3,3)}$ |

TABLE 37

| n = 7 | | | |
| --- | --- | --- | --- |
| $[A_7^{(3)}]_{(1,1)} = 3[P_7^{-1}]_{(3,3)}$ | $[A_7^{(3)}]_{(1,2)} = -3([P_7^{-1}]_{(1,3)})^*$ | $[A_7^{(3)}]_{(1,3)} = 3([P_7^{-1}]_{(2,3)})^*$ | |
| $[A_7^{(3)}]_{(2,2)} = 3[P_7^{-1}]_{(1,1)}$ | $[A_7^{(3)}]_{(2,3)} = -3[P_7^{-1}]_{(1,2)}$ | $[A_7^{(3)}]_{(3,3)} = 3[P_7^{-1}]_{(2,2)}$ | |

It can be seen from the above embodiment that the 8 pairs of codebook indices are not limited to the above embodiment, and other pairs of codebook indices may be used. Hence, 16 matrixes $\{A_n^{(3)}\}_{n=0}^{15}$ are calculated, and 48 diagonal elements are needed, which are expressed as $\{[A_n^{(3)}]_{(1,1)}, [A_n^{(3)}]_{(2,2)}, [A_n^{(3)}]_{(3,3)}\}$, and then corresponding metric values are calculated according to the diagonal elements. Therefore, when the rank is 3, with the above method, the complexity of calculation is simplified, the amount of calculation and the complexity of calculation are lowered, thereby lowering the consumption of power of the equipment, and reducing the size of the circuit needed by the chip in performing corresponding processing.

Figure 8:
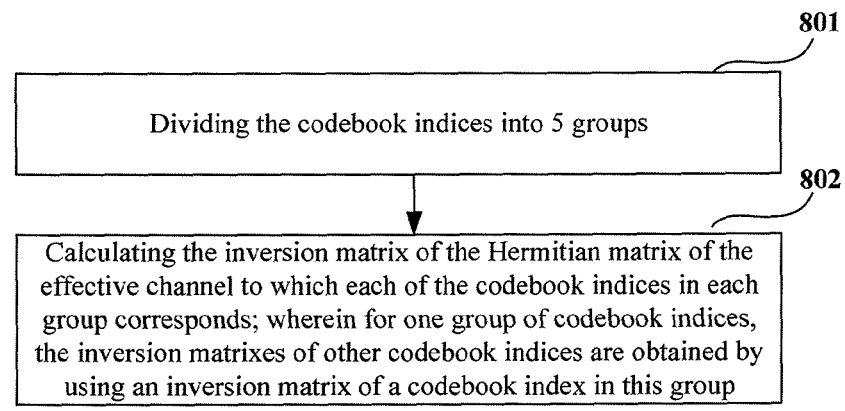
FIG. 8 is a flowchart of a method for calculating an inversion matrix when a rank is equal to 4 in accordance with the fifth embodiment of the present invention.

FIG. 8 is a flowchart of a method for calculating an inversion matrix when a rank is equal to 4 in accordance with the fifth embodiment of the present invention. The number of the codebook indices is 16, and as shown in FIG. 8, in calculating an inversion matrix, it comprises:

Step 801: dividing the codebook indices into 5 groups, wherein in each group of codebook indices, the diagonal elements in the inversion matrixes of the Hermitian matrixes of the effective channel of each of the codebook indices belong to the same set and are different orders, that is, the Hermitian matrixes of the effective channel of each codebook index in each group may be transformed into the same matrix after row and column transform;

in this embodiment, the number of the codebook indices is 16, and each of 3 of the 5 groups may contain 4 codebook indices, and each of the rest 2 groups may contain 2 codebook indices;

for example, the 5 groups of codebook indices may be (0, 2, 8, 10), (1, 3, 9, 11), (12, 13, 14, 15), (4,6), (5,7);

Step 802: calculating the inversion matrix (as shown in formula (9)) of the Hermitian matrix of the effective channel to which each of the codebook indices in each group corresponds; wherein the calculation is performed in a manner as follows:

for one group of codebook indices, calculating an inversion matrix ($A_n^{(4)}$ as shown in formula (9), where, n=0~15) of a Hermitian matrix related to the Hermitian matrix of the effective channel and to which one codebook index in the codebook indices corresponds; and obtaining the inversion matrixes to which other codebook indices in the group of codebook indices correspond, by using the relationship between the inversion matrix to which the one codebook index corresponds and the inversion matrixes of the Hermitian matrixes of the effective channels to which the other codebook indices in the group of codebook indices correspond, and using the inversion matrix to which the one codebook index corresponds.

That is, for each group of codebook indices, one codebook index in this group is taken as a basic index, and the inversion matrix (as shown in formula (9)) to which the basic index corresponds is calculated; then relationship between the inversion matrixes to which other codebook indices correspond and the inversion matrix to which the basic index corresponds is obtained; and the inversion matrixes to which other codebook indices in the group correspond by using the inversion matrix to which the basic index corresponds are obtained.

In this embodiment, the basic index may be 0, 1, 12, 4, 5; however, the manner of selecting a basic index is not limited to the above, and for each group, other codebook indices may also be selected as basic indices. The inversion matrix to which the basic index corresponds may be obtained by using the matrixes to which the items in Table 11 when the rank=4 correspond.

Furthermore, only a Hermitian matrix to which one codebook index corresponds needs to be calculated, and the Hermitian matrixes to which other codebook indices correspond may be obtained through inversion matrix properties; that is, inversion matrixes $A_n^{(4)}$ of the Hermitian matrixes of different codebook indices may be obtained through simple order permutation.

Following is description of inversion matrix properties. For example, for an invertible matrix A of N×N dimension, if its inversion matrix is B, i.e. AB=I, then there will be the following properties:

following three operations are performed to the column (row) vectors of A:

1) performing order permutation to the column (row) vectors;

2) multiplying a certain column (row) vector by −1;

3) multiplying a certain column (row) vector by j;

therefore, the inversion matrix of the matrix to which the transformed A corresponds is a result of performing column (row) transform to matrix B, that is:

1) performing order permutation to corresponding column (row) vectors;

2) multiplying a certain column (row) vector by −1;

3) multiplying a certain column (row) vector by −j.

Hence, the inversion matrixes $A_n^{(4)}$ of the Hermitian matrixes of different codebook indices may be obtained by using inversion matrix properties.

Furthermore, in calculating metric values, only diagonal elements are needed. Hence, the diagonal elements of the matrix may only be calculated. Following description is given taking 5 groups of codebook indices, (0, 2, 8, 10), (1, 3, 9, 11), (12, 13, 14, 15), (4,6), (5,7), as an example. All the elements are calculated in the following examples.

Example 1: the first group of codebook indices (0, 2, 8, 10)

taking the codebook index 0 as a basic index to calculate an inversion matrix $A_0^{(4)}$ to which it corresponds, and obtaining the inversion matrixes to which other codebook indices (2, 8, 10) correspond by using relationship between $A_0^{(4)}$ and $A_n^{(4)}$ (n=2, 8, 10), the relationship between $A_0^{(4)}$ and $A_n^{(4)}$ being shown in Tables 38-40, which may be obtained according to the inversion matrix properties.

TABLE 38 n = 2

$[A_2^{(4)}]_{(1,1)} = [A_0^{(4)}]_{(1,1)}$   $[A_2^{(4)}]_{(1,2)} = -[A_0^{(4)}]_{(1,4)}$   $[A_2^{(4)}]_{(1,3)} = [A_0^{(4)}]_{(1,3)}$   $[A_2^{(4)}]_{(1,4)} = -[A_0^{(4)}]_{(1,2)}$
$[A_2^{(4)}]_{(2,2)} = [A_0^{(4)}]_{(4,4)}$   $[A_2^{(4)}]_{(2,3)} = -([A_0^{(4)}]_{(3,4)})^*$   $[A_2^{(4)}]_{(2,4)} = ([A_0^{(4)}]_{(2,4)})^*$   $[A_2^{(4)}]_{(3,3)} = [A_0^{(4)}]_{(3,3)}$
$[A_2^{(4)}]_{(3,4)} = -([A_0^{(4)}]_{(2,3)})^*$   $[A_2^{(4)}]_{(4,4)} = [A_0^{(4)}]_{(2,2)}$

TABLE 39 n = 8

$[A_8^{(4)}]_{(1,1)} = [A_0^{(4)}]_{(2,2)}$   $[A_8^{(4)}]_{(1,2)} = ([A_0^{(4)}]_{(1,2)})^*$   $[A_8^{(4)}]_{(1,3)} = -[A_0^{(4)}]_{(2,4)}$   $[A_8^{(4)}]_{(1,4)} = -[A_0^{(4)}]_{(2,3)}$
$[A_8^{(4)}]_{(2,2)} = [A_0^{(4)}]_{(1,1)}$   $[A_8^{(4)}]_{(2,3)} = -[A_0^{(4)}]_{(1,4)}$   $[A_8^{(4)}]_{(2,4)} = -[A_0^{(4)}]_{(1,3)}$   $[A_8^{(4)}]_{(3,3)} = [A_0^{(4)}]_{(4,4)}$
$[A_8^{(4)}]_{(3,4)} = ([A_0^{(4)}]_{(3,4)})^*$   $[A_8^{(4)}]_{(4,4)} = [A_0^{(4)}]_{(3,3)}$

TABLE 40 n = 10

$[A_{10}^{(4)}]_{(1,1)} = [A_0^{(4)}]_{(4,4)}$   $[A_{10}^{(4)}]_{(1,2)} = -([A_0^{(4)}]_{(2,4)})^*$   $[A_{10}^{(4)}]_{(1,3)} = -([A_0^{(4)}]_{(3,4)})^*$   $[A_{10}^{(4)}]_{(1,4)} = ([A_0^{(4)}]_{(1,4)})^*$
$[A_{10}^{(4)}]_{(2,2)} = [A_0^{(4)}]_{(2,2)}$   $[A_{10}^{(4)}]_{(2,3)} = [A_0^{(4)}]_{(2,3)}$   $[A_{10}^{(4)}]_{(2,4)} = -([A_0^{(4)}]_{(1,2)})^*$   $[A_{10}^{(4)}]_{(3,3)} = [A_0^{(4)}]_{(3,3)}$
$[A_{10}^{(4)}]_{(3,4)} = -([A_0^{(4)}]_{(1,3)})^*$   $[A_{10}^{(4)}]_{(4,4)} = [A_0^{(4)}]_{(1,1)}$

Example 2: the second group of codebook indices (1, 3, 9, 11) taking the codebook index 1 as a basic index to calculate an inversion matrix $A_1^{(4)}$ to which it corresponds, and obtaining the inversion matrixes to which other codebook indices (3, 9, 11) correspond by using relationship between $A_1^{(4)}$ and $A_n^{(4)}$ (n=3, 9, 11), the relationship between $A_1^{(4)}$ and $A_n^{(4)}$ being shown in Tables 41-43.

TABLE 41 n = 3

$[A_3^{(4)}]_{(1,1)} = [A_1^{(4)}]_{(1,1)}$   $[A_3^{(4)}]_{(1,2)} = -[A_1^{(4)}]_{(1,4)}$   $[A_3^{(4)}]_{(1,3)} = [A_1^{(4)}]_{(1,3)}$
$[A_3^{(4)}]_{(2,2)} = [A_1^{(4)}]_{(4,4)}$   $[A_3^{(4)}]_{(2,3)} = -([A_1^{(4)}]_{(3,4)})^*$   $[A_3^{(4)}]_{(2,4)} = ([A_1^{(4)}]_{(2,4)})^*$
$[A_3^{(4)}]_{(3,4)} = -([A_1^{(4)}]_{(2,3)})^*$   $[A_3^{(4)}]_{(4,4)} = [A_1^{(4)}]_{(2,2)}$   $[A_3^{(4)}]_{(1,4)} = -[A_1^{(4)}]_{(1,2)}$
   $[A_3^{(4)}]_{(3,3)} = [A_1^{(4)}]_{(3,3)}$

TABLE 42 n = 9

$[A_9^{(4)}]_{(1,1)} = [A_1^{(4)}]_{(2,2)}$   $[A_9^{(4)}]_{(1,2)} = -([A_1^{(4)}]_{(1,2)})^*$   $[A_9^{(4)}]_{(1,3)} = -[A_1^{(4)}]_{(2,4)}$
$[A_9^{(4)}]_{(2,2)} = [A_1^{(4)}]_{(1,1)}$   $[A_9^{(4)}]_{(2,3)} = [A_1^{(4)}]_{(1,4)}$   $[A_9^{(4)}]_{(2,4)} = -[A_1^{(4)}]_{(1,3)}$
$[A_9^{(4)}]_{(3,4)} = -([A_1^{(4)}]_{(3,4)})^*$   $[A_9^{(4)}]_{(4,4)} = [A_1^{(4)}]_{(3,3)}$   $[A_9^{(4)}]_{(1,4)} = [A_1^{(4)}]_{(2,3)}$
   $[A_9^{(4)}]_{(3,3)} = [A_1^{(4)}]_{(4,4)}$

TABLE 43 n = 11

$[A_{11}^{(4)}]_{(1,1)} = [A_1^{(4)}]_{(4,4)}$   $[A_{11}^{(4)}]_{(1,2)} = -([A_1^{(4)}]_{(2,4)})^*$   $[A_{11}^{(4)}]_{(1,3)} = ([A_1^{(4)}]_{(3,4)})^*$
$[A_{11}^{(4)}]_{(2,2)} = [A_1^{(4)}]_{(2,2)}$   $[A_{11}^{(4)}]_{(2,3)} = -[A_1^{(4)}]_{(2,3)}$   $[A_{11}^{(4)}]_{(2,4)} = ([A_1^{(4)}]_{(1,2)})^*$
$[A_{11}^{(4)}]_{(3,4)} = -([A_1^{(4)}]_{(1,3)})^*$   $[A_{11}^{(4)}]_{(4,4)} = [A_1^{(4)}]_{(1,1)}$   $[A_{11}^{(4)}]_{(1,4)} = -([A_1^{(4)}]_{(1,4)})^*$
   $[A_{11}^{(4)}]_{(3,3)} = [A_1^{(4)}]_{(3,3)}$

Example 3: the third group of codebook indices (12, 13, 14, 15)

taking the codebook index 12 as a basic index to calculate an inversion matrix $A_{12}^{(4)}$ to which it corresponds, and obtaining the inversion matrixes to which other codebook indices (13, 14, 15) correspond by using relationship between $A_{12}^{(4)}$ and $A_n^{(4)}$ (n=13, 14, 15), the relationship between $A_{12}^{(4)}$ and $A_n^{(4)}$ being shown in Tables 44-46.

TABLE 44 n = 13

$[A_{13}^{(4)}]_{(1,1)} = [A_{12}^{(4)}]_{(2,2)}$   $[A_{13}^{(4)}]_{(1,2)} = [A_{12}^{(4)}]_{(2,4)}$   $[A_{13}^{(4)}]_{(1,3)} = ([A_{12}^{(4)}]_{(1,2)})^*$
$[A_{13}^{(4)}]_{(2,2)} = [A_{12}^{(4)}]_{(4,4)}$   $[A_{13}^{(4)}]_{(2,3)} = ([A_{12}^{(4)}]_{(1,4)})^*$   $[A_{13}^{(4)}]_{(2,4)} = ([A_{12}^{(4)}]_{(3,4)})^*$
$[A_{13}^{(4)}]_{(3,4)} = [A_{12}^{(4)}]_{(1,3)}$   $[A_{13}^{(4)}]_{(4,4)} = [A_{12}^{(4)}]_{(3,3)}$   $[A_{13}^{(4)}]_{(1,4)} = [A_{12}^{(4)}]_{(2,3)}$
   $[A_{13}^{(4)}]_{(3,3)} = [A_{12}^{(4)}]_{(1,1)}$

TABLE 45 n = 14

$[A_{14}^{(4)}]_{(1,1)} = [A_{12}^{(4)}]_{(1,1)}$   $[A_{14}^{(4)}]_{(1,2)} = [A_{12}^{(4)}]_{(1,4)}$   $[A_{14}^{(4)}]_{(1,3)} = [A_{12}^{(4)}]_{(1,3)}$
$[A_{14}^{(4)}]_{(2,2)} = [A_{12}^{(4)}]_{(4,4)}$   $[A_{14}^{(4)}]_{(2,3)} = ([A_{12}^{(4)}]_{(3,4)})^*$   $[A_{14}^{(4)}]_{(2,4)} = ([A_{12}^{(4)}]_{(2,4)})^*$
$[A_{14}^{(4)}]_{(3,4)} = ([A_{12}^{(4)}]_{(2,3)})^*$   $[A_{14}^{(4)}]_{(4,4)} = [A_{12}^{(4)}]_{(2,2)}$   $[A_{14}^{(4)}]_{(1,4)} = [A_{12}^{(4)}]_{(1,2)}$
   $[A_{14}^{(4)}]_{(3,3)} = [A_{12}^{(4)}]_{(3,3)}$

TABLE 46 n = 15

$[A_{15}^{(4)}]_{(1,1)} = [A_{12}^{(4)}]_{(4,4)}$   $[A_{15}^{(4)}]_{(1,2)} = ([A_{12}^{(4)}]_{(3,4)})^*$   $[A_{15}^{(4)}]_{(1,3)} = ([A_{12}^{(4)}]_{(2,4)})^*$
$[A_{15}^{(4)}]_{(2,2)} = [A_{12}^{(4)}]_{(3,3)}$   $[A_{15}^{(4)}]_{(2,3)} = ([A_{12}^{(4)}]_{(2,3)})^*$   $[A_{15}^{(4)}]_{(2,4)} = ([A_{12}^{(4)}]_{(1,3)})^*$
$[A_{15}^{(4)}]_{(3,4)} = ([A_{12}^{(4)}]_{(1,2)})^*$   $[A_{15}^{(4)}]_{(4,4)} = [A_1^{(4)}]_{(1,1)}$   $[A_{15}^{(4)}]_{(1,4)} = ([A_{12}^{(4)}]_{(1,4)})^*$
   $[A_{15}^{(4)}]_{(3,3)} = [A_{12}^{(4)}]_{(2,2)}$

Example 4: the fourth group of codebook indices (4, 6)

taking the codebook index 4 as a basic index to calculate an inversion matrix $A_4^{(4)}$ to which it corresponds, and obtaining the inversion matrix to which the other codebook index (6) corresponds by using relationship between $A_4^{(4)}$ and $A_n^{(4)}$ (n=6), the relationship between $A_4^{(4)}$ and $A_n^{(4)}$ being shown in Table 47.

TABLE 47 n = 6

| | | |
|---|---|---|
| $[A_6^{(4)}]_{(1,1)} = [A_4^{(4)}]_{(3,3)}$ | $[A_6^{(4)}]_{(1,2)} = -([A_4^{(4)}]_{(1,3)})^*$ | $[A_6^{(4)}]_{(1,3)} = -[A_4^{(4)}]_{(3,4)}$ |
| $[A_6^{(4)}]_{(2,2)} = [A_4^{(4)}]_{(1,1)}$ | $[A_6^{(4)}]_{(2,3)} = [A_4^{(4)}]_{(1,4)}$ | $[A_6^{(4)}]_{(2,4)} = -[A_4^{(4)}]_{(1,2)}$ |
| $[A_6^{(4)}]_{(3,4)} = -([A_4^{(4)}]_{(2,4)})^*$ | $[A_6^{(4)}]_{(4,4)} = [A_4^{(4)}]_{(2,2)}$ | $[A_6^{(4)}]_{(1,4)} = ([A_4^{(4)}]_{(2,3)})^*$ |
| | | $[A_6^{(4)}]_{(3,3)} = [A_4^{(4)}]_{(4,4)}$ |

Example 5: the fifth group of codebook indices (5, 7)

taking the codebook index 5 as a basic index to calculate an inversion matrix $A_5^{(4)}$ to which it corresponds, and obtaining the inversion matrix to which the other codebook index (7) corresponds by using relationship between $A_5^{(4)}$ and $A_n^{(4)}$ (n=7), the relationship between $A_5^{(4)}$ and $A_n^{(4)}$ being shown in Table 48.

TABLE 48 n = 7

| | | |
|---|---|---|
| $[A_7^{(4)}]_{(1,1)} = [A_5^{(4)}]_{(3,3)}$ | $[A_7^{(4)}]_{(1,2)} = -([A_5^{(4)}]_{(1,3)})^*$ | $[A_7^{(4)}]_{(1,3)} = -[A_5^{(4)}]_{(3,4)}$ |
| $[A_7^{(4)}]_{(2,2)} = [A_5^{(4)}]_{(1,1)}$ | $[A_7^{(4)}]_{(2,3)} = [A_5^{(4)}]_{(1,4)}$ | $[A_7^{(4)}]_{(2,4)} = -[A_5^{(4)}]_{(1,2)}$ |
| $[A_7^{(4)}]_{(3,4)} = -([A_5^{(4)}]_{(2,4)})^*$ | $[A_7^{(4)}]_{(4,4)} = [A_5^{(4)}]_{(2,2)}$ | $[A_7^{(4)}]_{(1,4)} = ([A_5^{(4)}]_{(2,3)})^*$ |
| | | $[A_7^{(4)}]_{(3,3)} = [A_5^{(4)}]_{(4,4)}$ |

It can be seen from the above embodiment that after the Hermitian matrixes of the effective channel are obtained by using the method of the second embodiment, metric values may be calculated by using the Hermitian matrixes of the effective channel, which simplifies the complexity of calculation and lowers the amount of calculation and the complexity of calculation, thereby lowering the power consumption of the equipment, and reducing the circuit size needed in performing corresponding processing.

Furthermore, in cases where the rank is 3 and the rank is 4, in calculating metric values, inversion matrixes of the Hermitian matrixes of the effective channel shown in formula (9) need to be calculated, for further simplifying the complexity of calculation, this may be carried out by using the methods as shown in FIGS. 7 and 8, thereby simplifying the complexity of calculation.

Figure 9:
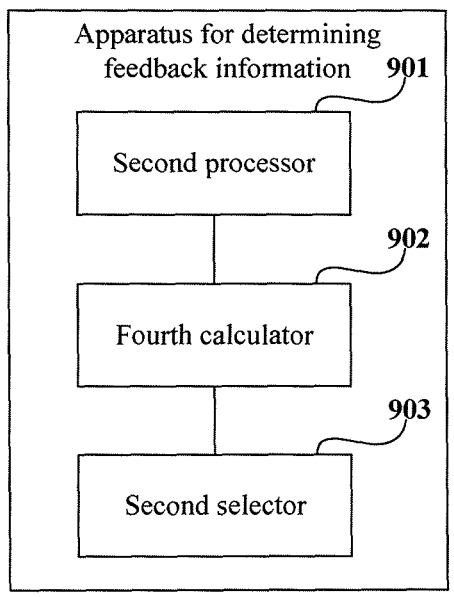
FIG. 9 is a schematic diagram showing the structure of an apparatus for determining feedback information in accordance with the sixth embodiment of the present invention.

FIG. 9 is a schematic diagram showing the structure of an apparatus for determining feedback information in accordance with the sixth embodiment of the present invention. As shown in FIG. 9, the apparatus comprises: a second processor 901, a fourth calculator 902 and a second selector 903; wherein, the structure of the second processor 901 is as that of the fourth embodiment, and as shown in FIG. 5, it comprises a first selector, a first calculator and a processor, with the function of which being similar to those of the first selector 501, the first calculator 502 and the processor 503, respectively, which shall not be described any further;

the fourth calculator 902 is used for calculating metric values to which each codebook index and rank correspond based on the Hermitian matrix of the effective channel; in this embodiment, the metric values may be calculated by using the method of step 602 of the fifth embodiment, which shall not be described any further; and the second selector 903 is used for selecting the codebook index and rank to which the maximal metric value corresponds as the feedback information fed back to a transmission side.

It can be seen from the above embodiment that since the method of the second embodiment is used in determining the Hermitian matrixes of the effective channel by the second processor 901, the complexity of calculation is lowered, thereby lowering the power consumption of the equipment, and reducing the circuit size needed in performing corresponding processing.

Furthermore, in cases where the rank is 3 and the rank is 4, in order to further lower the complexity of calculation, lower the power consumption of the equipment, and reduce the circuit size needed in performing corresponding processing, the inversion matrices of the Hermitian matrixes of the effective channel (as shown in formula (9)) are further calculated by using the methods as shown in FIGS. 7 and 8. The structure of the fourth calculator shall be described below with reference to FIGS. 10 and 11.

Figure 10:
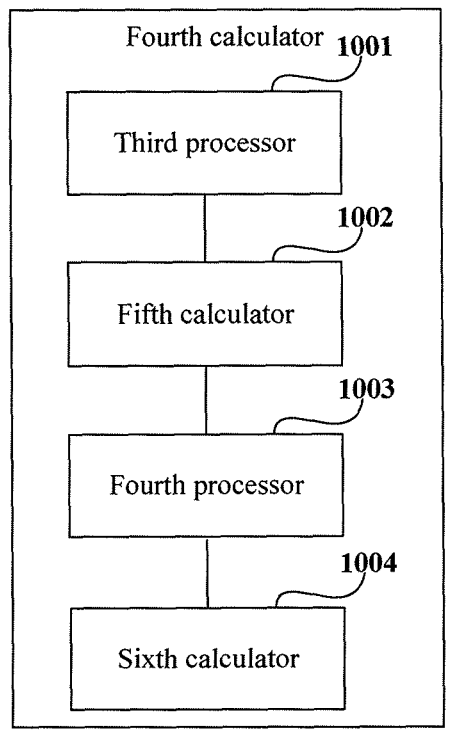
FIG. 10 is a schematic diagram showing the structure of a fourth calculator when a rank is equal to 3 in accordance with the sixth embodiment of the present invention.

FIG. 10 is a schematic diagram showing the structure of the fourth calculator when a rank is equal to 3 of the sixth embodiment of the present invention. As shown in FIG. 10, the fourth calculator comprises: a third processor 1001, a fifth calculator 1002, a fourth processor 1003, and a sixth calculator 1004; wherein, the third processor 1001 is used for performing row transform and column transform on Hermitian matrixes of effective channels of two codebook indices, so that the transformed Hermitian matrixes of the effective channels have identical submatrixes located at the upper left and with a dimension of 2×2; in this embodiment, the detailed processing of the third processor 1001 is as described in the fifth embodiment, i.e. in step 701, which shall not be described any further;

the fifth calculator 1002 is used for executing jointly inversion to the transformed Hermitian matrixes of the effective channels of the two codebook indices by using the block inversion lemma of Hermitian matrix, so as to obtain respective inversion matrixes; and its detailed processing is as described in the fifth embodiment, i.e. in step 702, which shall not be described any further;

the fourth processor 1003 is used for determining diagonal elements in the inversion matrixes of the Hermitian matrixes of the effective channels by using the obtained inversion matrixes; and the sixth calculator 1004 is used for calculating the metric values by using the diagonal elements.

Figure 11:
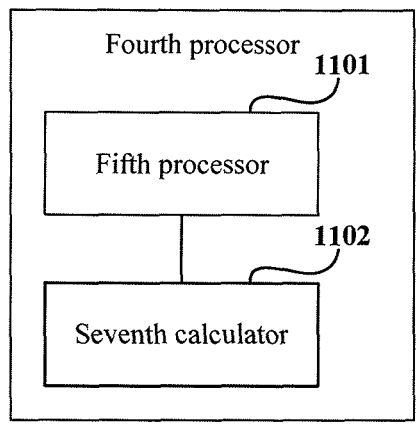
FIG. 11 is a schematic diagram showing the structure of the fourth calculator when a rank is equal to 4 in accordance with the sixth embodiment of the present invention.

FIG. 11 is a schematic diagram showing the structure of the fourth calculator when a rank is equal to 4 of the sixth embodiment of the present invention. As shown in FIG. 11, the fourth calculator comprises: a fifth processor 1101 and a seventh calculator 1102; wherein, the fifth processor 1101 is used for dividing the codebook indices into 5 groups, wherein in each group of codebook indices, the diagonal elements in the inversion matrixes of the Hermitian matrixes of the effective channel of each of the codebook indices belong to the same set and are different orders; the detailed processing of the fifth processor 1101 is as described in the fifth embodiment and shown in FIG. 8, which shall not be described any further;

the seventh calculator 1102 is used for calculating the inversion matrix of the Hermitian matrix of the effective channel to which each of the codebook indices in each group corresponds; wherein the calculating the inversion matrix for one group of codebook indices is used for: calculating the inversion matrix to which one codebook index in the one group of codebook indices corresponds; and obtaining the inversion matrixes to which other codebook indices in the one group of codebook indices correspond, by using the relationship between the inversion matrix to which the one codebook index corresponds and the inversion matrixes of the Hermitian matrixes of the effective channels to which the other codebook indices in the one group of codebook indices correspond, and using the inversion matrix to which the one codebook index corresponds; the detailed processing of the fifth processor 1101 is as described in the fifth embodiment and shown in FIG. 8, which shall not be described any further.

It can be seen from the above embodiment that since the method of the second embodiment is used in determining the Hermitian matrixes of the effective channel by the second processor 901, the complexity of calculation is lowered; furthermore, in a case where the rank is 3 or 4, when the fourth calculator shown in FIGS. 10 and 11 is used for calculating the metric values, the complexity of calculation may be further lowered, thereby lowering the consumption of power of the equipment, and reducing the circuit size needed in performing corresponding processing.

The seventh embodiment of the present invention further provides a method for determining feedback information. This embodiment is for the case where the rank is 3. This method is similar to the case of the fifth embodiment, and the parts identical to those of the fifth embodiment shall not be described any further.

In this embodiment, for step 601, any existing manner may be used in this step to determine the Hermitian matrix of the effective channel, and the method of the second embodiment of the present invention may not be used.

In this embodiment, for step 602, the method shown in FIG. 7 is used in this step to calculate the inversion matrices of the Hermitian matrixes of the effective channel (as shown in formula (9)).

It can be seen from the above embodiment that in the case where the rank is 3, the above method of the embodiment of the present invention may simplify the complexity of the calculation, thereby lowering the power consumption of the equipment, and reducing the circuit size needed in performing corresponding processing.

Figure 12:
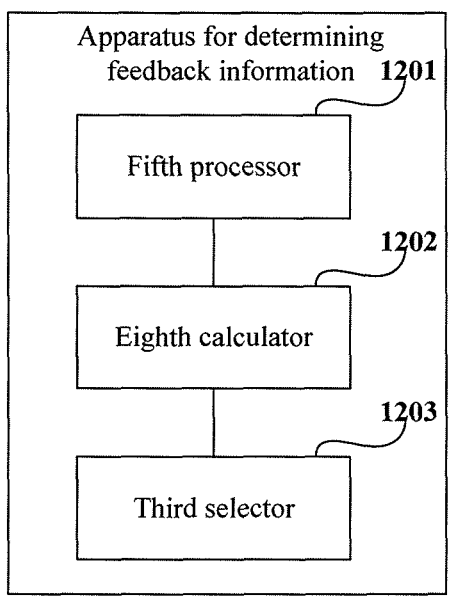
FIG. 12 is a schematic diagram showing the structure of an apparatus for determining feedback information in accordance with the eighth embodiment of the present invention.
Figure 13:
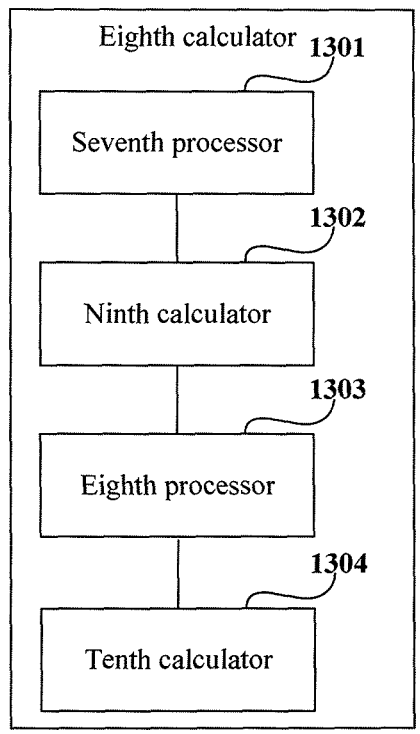
FIG. 13 is a schematic diagram showing the structure of an eighth calculator in accordance with the eighth embodiment of the present invention.

The eighth embodiment of the present invention provides an apparatus for determining feedback information. FIG. 12 is a schematic diagram showing the structure of the apparatus for determining feedback information in accordance with the eighth embodiment of the present invention. As shown in FIG. 12, the apparatus comprises: a fifth processor 1201, an eighth calculator 1202 and a third selector 1203; wherein, the fifth processor 1201 is used for determining a Hermitian matrix of an effective channel; in this embodiment, the fifth processor 1201 may use any existing manner to determine a Hermitian matrix of an effective channel, and may not use the method of the second embodiment of the present invention;

the eighth calculator 1202, with a structure similar to that of the fourth calculator shown in FIG. 10, is used for calculating metric values to which each codebook index and rank correspond based on the Hermitian matrix of the effective channel; and the detailed structure is as shown in FIG. 13, which shall not be described any further; and the third selector 1203, with a function similar to that of the second selector 903 shown in FIG. 9, is used for selecting the codebook index and rank to which the maximal metric value corresponds as the feedback information fed back to a transmission side, which shall not be described any further.

FIG. 13 is a schematic diagram showing the structure of the eighth calculator of the eighth embodiment of the present invention. As shown in FIG. 13, the eighth calculator comprises: a seventh processor 1301, a ninth calculator 1302, an eighth processor 1303, and a tenth calculator 1304; wherein the function of each of them is similar to that of the fourth calculator shown in FIG. 10, and shall be described below in brief:

the seventh processor 1301 is used for performing row transform and column transform on Hermitian matrixes of effective channels of two codebook indices, so that the transformed Hermitian matrixes of the effective channels have identical submatrixes located at the upper left and with a dimension of 2×2;

the ninth calculator 1302 is used for executing jointly inversion to the transformed Hermitian matrixes of the effective channels of the two codebook indices by using the block inversion lemma of Hermitian matrix, so as to obtain respective inversion matrixes;

the eighth processor 1303 is used for determining diagonal elements in the inversion matrixes of the Hermitian matrixes of the effective channels by using the obtained inversion matrixes; and the tenth calculator 1304 is used for calculating the metric values by using the diagonal elements.

The ninth embodiment of the present invention further provides a method for determining feedback information. This embodiment is for the case where the rank is 4. This method is similar to the case of the fifth embodiment shown in FIG. 6, and the features identical to those of the fifth embodiment shall not be described any further.

In this embodiment, for step 601, any existing manner may be used in this step to determine the Hermitian matrix of the effective channel, and the method of the second embodiment of the present invention may not be used.

In this embodiment, for step 602, the method shown in FIG. 7 is used in this step to calculate the inversion matrices of the Hermitian matrixes of the effective channel (as shown in formula (9)).

It can be seen from the above embodiment that in the case where the rank is 4, the above method of the embodiment of the present invention may simplify the calculation, and lower the complexity of calculation.

Figure 14:
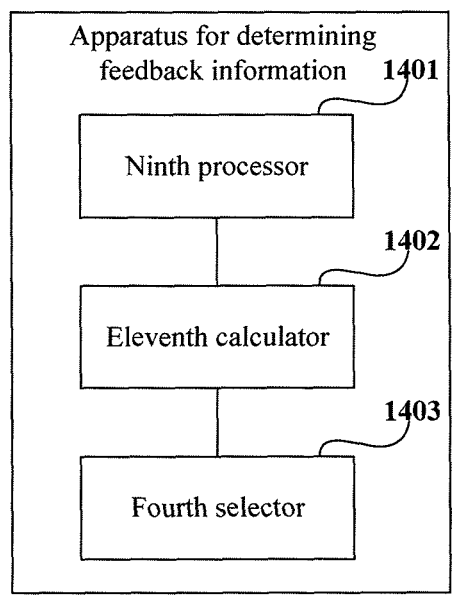
FIG. 14 is a schematic diagram showing the structure of an apparatus for determining feedback information in accordance with the tenth embodiment of the present invention.

The tenth embodiment of the present invention provides an apparatus for determining feedback information. FIG. 14 is a schematic diagram showing the structure of the apparatus for determining feedback information in accordance with the tenth embodiment of the present invention. As shown in FIG. 14, the apparatus comprises: a ninth processor 1401, an eleventh calculator 1402 and a fourth selector 1403; wherein, the ninth processor 1401 is used for determining a Hermitian matrix of an effective channel; in this embodiment, the ninth processor 1401 may use any existing manner to determine a Hermitian matrix of an effective channel, and may not use the method of the second embodiment of the present invention;

the eleventh calculator 1402, with a structure similar to that of the fourth calculator shown in FIG. 11, is used for calculating metric values to which each codebook index and rank correspond based on the Hermitian matrix of the effective channel; and the fourth selector 1403, with a function similar to that of the second selector 903 shown in FIG. 9, is used for selecting the codebook index and rank to which the maximal metric value corresponds as the feedback information fed back to a transmission side, which shall not be described any further.

Figure 15:
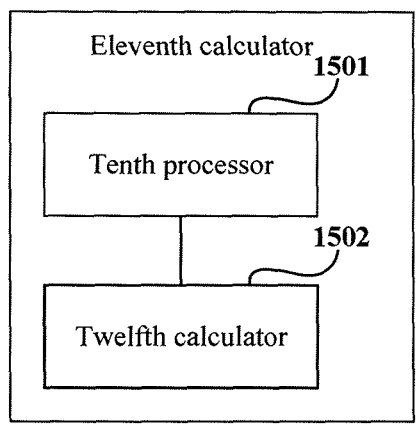
FIG. 15 is a schematic diagram showing the structure of an eleventh calculator in accordance with the tenth embodiment of the present invention.

FIG. 15 is a schematic diagram showing the structure of the eleventh calculator of the tenth embodiment of the present invention. As shown in FIG. 15, the eleventh calculator comprises:

a tenth processor 1501 used for dividing the codebook indices into 5 groups, wherein in each group of codebook indices, the diagonal elements in the inversion matrixes of the Hermitian matrixes of the effective channel of each of the codebook indices belong to the same set and are different orders; and a twelfth calculator 1502 used for calculating the inversion matrix of the Hermitian matrix of the effective channel to which each of the codebook indices in each group corresponds; wherein the calculating the inversion matrix for one group of codebook indices comprises:

calculating the inversion matrix to which one codebook index in the one group of codebook indices corresponds; and obtaining the inversion matrixes to which other codebook indices in the one group of codebook indices correspond, by using the relationship between the inversion matrix to which the one codebook index corresponds and the inversion matrixes of the Hermitian matrixes of the effective channels to which the other codebook indices in the one group of codebook indices correspond, and using the inversion matrix to which the one codebook index corresponds.

It can be seen from the above embodiment that in determining feedback information, when the rank is 3 or 4, the complexity of calculation may be further lowered if the fourth calculator shown in FIGS. 10 and 11 is used in calculating metric values.

In the above embodiment, the apparatus for determining feedback information may be UE.

The above apparatuses and methods of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments; however, it should be understood by those skilled in the art that such description is illustrative only, and is not intended to limit the protection scope of the present invention. Various variants and modifications may be made by those skilled in the art in accordance with the spirits and principle of the present invention, and such variants and modifications also fall within the scope of the present invention.

For the implementation of the present invention containing the above embodiments, following supplements are further disclosed.

Supplement 1. A method for determining an effective channel, comprising:

selecting more than one basic column vectors for determining a precoding matrix;

calculating products of channel row vectors and the basic column vectors; and determining the effective channel or a Hermitian matrix of the effective channel by using the products.

Supplement 2. The method according to supplement 1, wherein when there is the same computational parts in the multiplication operation of the channel row vectors and the basic column vectors, the calculating products of channel row vectors and the basic column vectors comprises:

calculating the same computational parts; and using the same computational parts to calculate the products of channel row vectors and the basic column vectors.

Supplement 3. The method according to supplement 1 or 2, wherein the precoding matrix is determined by directly using the basic column vectors or by multiplying the basic column vectors by unit real numbers or unit imaginary numbers.

Supplement 4. An apparatus for determining an effective channel, comprising:

a first selector for selecting more than one basic column vectors for determining a precoding matrix;

a first calculator for calculating products of channel row vectors and the basic column vectors; and a first processor for determining the effective channel or a Hermitian matrix of the effective channel by using the products.

Supplement 5. The apparatus according to supplement 4, wherein if there is the same computational parts in the multiplication operation of the channel row vectors and the basic column vectors, the first calculator comprises:

a second calculator for calculating the same computational parts; and a third calculator for calculating the products of the channel row vectors and the basic column vectors by using the same computational parts.

Supplement 6. A method for determining feedback information, comprising:

determining a Hermitian matrix of an effective channel by using the method as described in any one of supplements 1-3;

calculating metric values to which each codebook index and rank correspond based on the Hermitian matrix of the effective channel; and determining that the codebook index and rank to which the maximal metric value corresponds as the feedback information fed back to a transmission side.

Supplement 7. The method according to supplement 6, wherein when the rank is 3, the calculating metric values to which each codebook index and rank correspond based on the Hermitian matrix of the effective channel comprises:

performing row transform and column transform on Hermitian matrixes of effective channels of two codebook indices, so that the transformed Hermitian matrixes of the effective channels have identical submatrixes located at the upper left and with a dimension of 2×2;

executing jointly inversion to the transformed Hermitian matrixes of the effective channels of the two codebook indices by using the block inversion lemma of Hermitian matrix, so as to obtain respective inversion matrixes;

determining diagonal elements in the inversion matrixes of the Hermitian matrixes of the effective channels by using the obtained inversion matrixes; and calculating the metric values by using the diagonal elements Supplement 8. The method according to supplement 6, wherein when the rank is 4 and the number of the codebook indices is 16, the calculating metric values to which each codebook index and rank correspond based on the Hermitian matrix of the effective channel comprises:

dividing the codebook indices into 5 groups, wherein in each group of codebook indices, the diagonal elements in the inversion matrixes of the Hermitian matrixes of the effective channel of each of the codebook indices belong to the same set and are different orders; and calculating the inversion matrix of the Hermitian matrix of the effective channel to which each of the codebook indices in each group corresponds; wherein the calculating the inversion matrix for one group of codebook indices comprises:

calculating the inversion matrix to which one codebook index in the one group of codebook indices corresponds; and obtaining the inversion matrixes to which other codebook indices in the one group of codebook indices correspond, by using the relationship between the inversion matrix to which the one codebook index corresponds and the inversion matrixes of the Hermitian matrixes of the effective channels to which the other codebook indices in the one group of codebook indices correspond, and using the inversion matrix to which the one codebook index corresponds.

Supplement 9. An apparatus for determining feedback information, comprising:

a second processor comprising every components as described in supplement 4 or 5, for determining a Hermitian matrix of an effective channel;

a fourth calculator for calculating metric values to which each codebook index and rank correspond based on the Hermitian matrix of the effective channel; and a second selector for selecting the codebook index and rank to which the maximal metric value corresponds as the feedback information fed back to a transmission side.

Supplement 10. The apparatus according to supplement 9, wherein when the rank is 3, the fourth calculator comprises:

a third processor for performing row transform and column transform on Hermitian matrixes of effective channels of two codebook indices, so that the transformed Hermitian matrixes of the effective channels have identical submatrixes located at the upper left and with a dimension of 2×2;

a fifth calculator for executing jointly inversion to the transformed Hermitian matrixes of the effective channels of the two codebook indices by using the block inversion lemma of Hermitian matrix, so as to obtain respective inversion matrixes;

a fourth processor for determining diagonal elements in the inversion matrixes of the Hermitian matrixes of the effective channels by using the obtained inversion matrixes; and a sixth calculator for calculating the metric values by using the diagonal elements.

Supplement 11. The apparatus according to supplement 9, wherein when the rank is 4 and the number of the codebook indices is 16, the fourth calculator comprises:

a fifth processor for dividing the codebook indices into 5 groups, wherein in each group of codebook indices, the diagonal elements in the inversion matrixes of the Hermitian matrixes of the effective channel of each of the codebook indices belong to the same set and are different orders; and a seventh calculator for calculating the inversion matrix of the Hermitian matrix of the effective channel to which each of the codebook indices in each group corresponds; wherein the calculating the inversion matrix for one group of codebook indices comprises:

calculating the inversion matrix to which one codebook index in the one group of codebook indices corresponds; and obtaining the inversion matrixes to which other codebook indices in the one group of codebook indices correspond, by using the relationship between the inversion matrix to which the one codebook index corresponds and the inversion matrixes of the Hermitian matrixes of the effective channels to which the other codebook indices in the one group of codebook indices correspond, and using the inversion matrix to which the one codebook index corresponds.

Supplement 12. A method for determining feedback information, comprising:

determining a Hermitian matrix of an effective channel;

calculating metric values to which each codebook index and rank correspond based on the Hermitian matrix of the effective channel; and determining that the codebook index and rank to which the maximal metric value corresponds as the feedback information fed back to a transmission side;

wherein when the rank is 3, the calculating metric values to which each codebook index and rank correspond based on the Hermitian matrix of the effective channel comprises:

performing row transform and column transform on Hermitian matrixes of effective channels of two codebook indices, so that the transformed Hermitian matrixes of the effective channels have identical submatrixes located at the upper left and with a dimension of 2×2;

executing jointly inversion to the transformed Hermitian matrixes of the effective channels of the two codebook indices by using the block inversion lemma of Hermitian matrix, so as to obtain respective inversion matrixes;

determining diagonal elements in the inversion matrixes of the Hermitian matrixes of the effective channels by using the obtained inversion matrixes; and calculating the metric values by using the diagonal elements.

Supplement 13. An apparatus for determining feedback information, comprising:

a sixth processor for determining a Hermitian matrix of an effective channel;

an eighth calculator for calculating metric values to which each codebook index and rank correspond based on the Hermitian matrix of the effective channel; and a third selector for selecting the codebook index and rank to which the maximal metric value corresponds as the feedback information fed back to a transmission side;

wherein when the rank is 3, the eighth calculator comprises:

a seventh processor for performing row transform and column transform on Hermitian matrixes of effective channels of two codebook indices, so that the transformed Hermitian matrixes of the effective channels have identical submatrixes located at the upper left and with a dimension of 2×2;

a ninth calculator for executing jointly inversion to the transformed Hermitian matrixes of the effective channels of the two codebook indices by using the block inversion lemma of Hermitian matrix, so as to obtain respective inversion matrixes;

an eighth processor for determining diagonal elements in the inversion matrixes of the Hermitian matrixes of the effective channels by using the obtained inversion matrixes; and a tenth calculator for calculating the metric values by using the diagonal elements.

Supplement 14. A method for determining feedback information, comprising:

determining a Hermitian matrix of an effective channel;

calculating metric values to which each codebook index and rank correspond based on the Hermitian matrix of the effective channel; and determining that the codebook index and rank to which the maximal metric value corresponds as the feedback information fed back to a transmission side;

wherein when the rank is 4 and the number of the codebook indices is 16, the calculating metric values to which each codebook index and rank correspond based on the Hermitian matrix of the effective channel comprises:

dividing the codebook indices into 5 groups, wherein in each group of codebook indices, the diagonal elements in the inversion matrixes of the Hermitian matrixes of the effective channel of each of the codebook indices belong to the same set and are different orders; and calculating the inversion matrix of the Hermitian matrix of the effective channel to which each of the codebook indices in each group corresponds; wherein the calculating the inversion matrix for one group of codebook indices comprises:

calculating the inversion matrix to which one codebook index in the one group of codebook indices corresponds; and obtaining the inversion matrixes to which other codebook indices in the one group of codebook indices correspond, by using the relationship between the inversion matrix to which the one codebook index corresponds and the inversion matrixes of the Hermitian matrixes of the effective channels to which the other codebook indices in the one group of codebook indices correspond, and using the inversion matrix to which the one codebook index corresponds.

Supplement 15. An apparatus for determining feedback information, comprising:

a ninth processor for determining a Hermitian matrix of an effective channel;

an eleventh calculator for calculating metric values to which each codebook index and rank correspond based on the Hermitian matrix of the effective channel; and a fourth selector for selecting the codebook index and rank to which the maximal metric value corresponds as the feedback information fed back to a transmission side;

wherein when the rank is 4 and the number of the codebook indices is 16, the eleventh calculator comprises:

a tenth processor for dividing the codebook indices into 5 groups, wherein in each group of codebook indices, the diagonal elements in the inversion matrixes of the Hermitian matrixes of the effective channel of each of the codebook indices belong to the same set and are different orders; and a twelfth calculator for calculating the inversion matrix of the Hermitian matrix of the effective channel to which each of the codebook indices in each group corresponds; wherein the calculating the inversion matrix for one group of codebook indices comprises:

calculating the inversion matrix to which one codebook index in the one group of codebook indices corresponds; and obtaining the inversion matrixes to which other codebook indices in the one group of codebook indices correspond, by using the relationship between the inversion matrix to which the one codebook index corresponds and the inversion matrixes of the Hermitian matrixes of the effective channels to which the other codebook indices in the one group of codebook indices correspond, and using the inversion matrix to which the one codebook index corresponds.

The invention claimed is:

1. An apparatus for determining an effective channel, comprising:
   a first selector for selecting more than one basic column vectors for determining a precoding matrix;
   a first calculator for calculating products of channel row vectors and the basic column vectors; and
   a first processor for determining the effective channel or a Hermitian matrix of the effective channel by using the products;
   wherein, if there is a common computational factor in the multiplication operation of the channel row vectors and the basic column vectors, the first calculator comprises:
   a second calculator for calculating the common computational factor; and
   a third calculator for calculating the products of the channel row vectors and the basic column vectors by using the common computational factor.

2. A method for determining feedback information, comprising:
   selecting more than one basic column vectors for determining a preceding matrix;
   calculating products of channel row vectors and the basic column vectors;
   determining, via a processor, an effective channel or a Hermitian matrix of an effective channel by using the products;
   calculating metric values to which each codebook index and rank correspond based on the Hermitian matrix of the effective channel; and
   determining that the codebook index and rank to which a maximal metric value corresponds as the feedback information fed back to a transmission side;
   wherein, when the rank is 3, the step of calculating metric values to which each codebook index and rank correspond based on the Hermitian matrix of the effective channel comprises:
   performing row transform and column transform on Hermitian matrixes of effective channels of two codebook indices, so that the transformed Hermitian matrixes of the effective channels have identical submatrixes located at the upper left and with a dimension of 2×2;
   executing jointly inversion to the transformed Hermitian matrixes of the effective channels of the two codebook indices by using the block inversion lemma of Hermitian matrix, so as to obtain respective inversion matrixes;
   determining diagonal elements in the inversion matrixes of the Hermitian matrixes of the effective channels by using the obtained inversion matrixes; and
   calculating the metric values by using the diagonal elements.

3. An apparatus for determining feedback information, comprising:
   a second processor, for determining a Hermitian matrix of an effective channel, wherein the second processor comprising:
   a first selector for selecting more than one basic column vectors for determining a precoding matrix;
   a first calculator for calculating products of channel row vectors and the basic column vectors; and
   a first processor for determining the effective channel or a Hermitian matrix of the effective channel by using the products;
   wherein the apparatus further comprising:
   a second calculator for calculating metric values to which each codebook index and rank correspond based on the Hermitian matrix of the effective channel; and
   a second selector for selecting the codebook index and rank to which a maximal metric value corresponds as the feedback information fed back to a transmission side;
   wherein when the rank is 3, the second calculator comprises:
   a third processor for performing row transform and column transform on Hermitian matrixes of effective channels of two codebook indices, so that the transformed Hermitian matrixes of the effective channels have identical submatrixes located at the upper left and with a dimension of 2×2;
   a third calculator for executing jointly inversion to the transformed Hermitian matrixes of the effective channels of the two codebook indices by using the block inversion lemma of Hermitian matrix, so as to obtain respective inversion matrixes;

a fourth processor for determining diagonal elements in the inversion matrixes of the Hermitian matrixes of the effective channels by using the obtained inversion matrixes; and a fourth calculator for calculating the metric values by using the diagonal elements.

4. An apparatus for determining feedback information, comprising:

a second processor for determining a Hermitian matrix of an effective channel, wherein the second processor comprising:

a first selector for selecting more than one basic column vectors for determining a precoding matrix;

a first calculator for calculating products of channel row vectors and the basic column vectors; and a first processor for determining the effective channel or a Hermitian matrix of the effective channel by using the products;

wherein the apparatus further comprising:

a second calculator for calculating metric values to which each codebook index and rank correspond based on the Hermitian matrix of the effective channel; and a second selector for selecting the codebook index and rank to which a maximal metric value corresponds as the feedback information fed back to a transmission side;

wherein when the rank is 4 and the number of the codebook indices is 16, the second calculator comprises:

a third processor for dividing the codebook indices into 5 groups, wherein in each group of codebook indices, the diagonal elements in the inversion matrixes of the Hermitian matrixes of the effective channel of each of the codebook indices belong to the same set and are different orders; and a third calculator for calculating the inversion matrix of the Hermitian matrix of the effective channel to which each of the codebook indices in each group corresponds; wherein the calculating the inversion matrix for one group of codebook indices comprises:

calculating the inversion matrix to which one codebook index in the one group of codebook indices corresponds; and obtaining the inversion matrixes to which other codebook indices in the one group of codebook indices correspond, by using the relationship between the inversion matrix to which the one codebook index corresponds and the inversion matrixes of the Hermitian matrixes of the effective channels to which the other codebook indices in the one group of codebook indices correspond, and using the inversion matrix to which the one codebook index corresponds.

5. An apparatus for determining feedback information, comprising:

a second processor, for determining a Hermitian matrix of an effective channel, wherein the second processor comprising:

a first selector for selecting more than one basic column vector for determining a precoding matrix;

a first calculator for calculating products of channel row vectors and the basic column vectors; and a first processor for determining the effective channel or a Hermitian matrix of the effective channel by using the products;

wherein if there is a common computational factor in the multiplication operation of the channel row vectors and the basic column vectors, there first calculator comprises:

a second calculator for calculating common computational factor; and a third calculator for calculating the products of the channel row vectors and the basic column vectors by using common computational factor;

wherein the apparatus further comprising:

a fourth calculator for calculating metric values to which each codebook index and rank correspond based on the Hermitian matrix of the effective channel; and a second selector for selecting the codebook index and rank to which a maximal metric value corresponds as the feedback information fed back to a transmission side.

6. A method for determining feedback information, comprising:

selecting more than one basic column vectors for determining a precoding matrix;

calculating products of channel row vectors and the basic column vectors;

determining, via a processor, an effective channel or a Hermitian matrix of an effective channel by using the products;

calculating metric values to which each codebook index and rank correspond based on the Hermitian matrix of the effective channel; and determining that the codebook index and rank to which a maximal metric value corresponds as the feedback information fed back to a transmission side;

wherein, when the rank is 4 and the number of the codebook indices is 16, the step of calculating metric values to which each codebook index and rank correspond based on the Hermitian matrix of the effective channel comprises:

dividing the codebook indices into 5 groups, wherein in each group of codebook indices, the diagonal elements in the inversion matrixes of the Hermitian matrixes of the effective channel of each of the codebook indices belong to the same set and are different orders; and calculating the inversion matrix of the Hermitian matrix of the effective channel to which each of the codebook indices in each group corresponds; wherein the calculating the inversion matrix for one group of codebook indices comprises:

calculating the inversion matrix to which one codebook index in the one group of codebook indices corresponds; and obtaining the inversion matrixes to which other codebook indices in the one group of codebook indices correspond, by using the relationship between the inversion matrix to which the one codebook index corresponds and the inversion matrixes of the Hermitian matrixes of the effective channels to which the other codebook indices in the one group of codebook indices correspond, and using the inversion matrix to which the one codebook index corresponds.

7. An apparatus for determining an effective channel, comprising:

a first selector component for selecting more than one basic column vector for determining a precoding matrix;

a first calculator component for calculating products of channel row vectors and the basic column vectors; and a first processor component for determining the effective channel or a Hermitian matrix of the effective channel by using the products;

wherein, if there is a common computational factor in the multiplication operation of the channel row vectors and the basic column vectors, the first calculator component comprises:

a second calculator component for calculating the common computational factor; and a third calculator component for calculating the products of the channel row vectors and the basic column vectors by using the common computational factor.

* * * * *